(12) United States Patent
Tsujita et al.

(10) Patent No.: US 8,171,578 B2
(45) Date of Patent: May 8, 2012

(54) WATER DISCHARGE SYSTEM

(75) Inventors: Masami Tsujita, Fukuoka (JP);
Tomoyuki Abe, Fukuoka (JP); Naoki Kabe, Fukuoka (JP); Hiroshi Tsuboi, Fukuoka (JP); Masayuki Nagaishi, Fukuoka (JP); Katsuhisa Tsuchiya, Fukuoka (JP); Shoichi Tsuiki, Fukuoka (JP); Kensuke Murata, Fukuoka (JP)

(73) Assignee: Toto Ltd., Fukuoka (JP)

( * ) Notice: Subject to any disclaimer, the term of this patent is extended or adjusted under 35 U.S.C. 154(b) by 266 days.

(21) Appl. No.: 12/182,990

(22) Filed: Jul. 30, 2008

(65) Prior Publication Data
US 2009/0031493 A1   Feb. 5, 2009

Related U.S. Application Data

(60) Provisional application No. 61/057,878, filed on Jun. 2, 2008.

(30) Foreign Application Priority Data

Jul. 31, 2007   (JP) .................................. 2007-199060

(51) Int. Cl.
  *E03C 1/05*   (2006.01)
(52) U.S. Cl. .......................................................... 4/623
(58) Field of Classification Search .............. 4/623, 302, 4/304; 251/129.04
See application file for complete search history.

(56) References Cited

U.S. PATENT DOCUMENTS

| | | | |
|---|---|---|---|
| 5,694,653 A * | 12/1997 | Harald | 4/623 |
| 6,067,673 A * | 5/2000 | Paese et al. | 4/623 |
| 6,206,340 B1 * | 3/2001 | Paese et al. | 251/129.04 |
| 6,250,601 B1 * | 6/2001 | Kolar et al. | 251/129.04 |

FOREIGN PATENT DOCUMENTS

| | | |
|---|---|---|
| JP | 61-75570 U | 5/1986 |
| JP | 09-080150 A | 3/1997 |
| JP | 2001-31191 A | 9/2001 |
| JP | 2001-311191 A | 11/2001 |
| JP | 2004-361355 A | 12/2004 |
| JP | 2007-154610 A | 6/2007 |

* cited by examiner

*Primary Examiner* — Tuan Nguyen
(74) *Attorney, Agent, or Firm* — Kimble Intellectual Property Law, PLLC

(57) ABSTRACT

There is provided a water discharge system. A water discharge system includes a water discharge portion; a sensor unit which acquires movement information about an object based on a radiated electric wave, and outputs a detecting signal; and a control unit which controls water discharge of the water discharge portion based on the detecting signal. When it is detected that the object is decelerated to a first threshold velocity or less, the control unit controls the water discharge portion to start the water discharge.

3 Claims, 23 Drawing Sheets

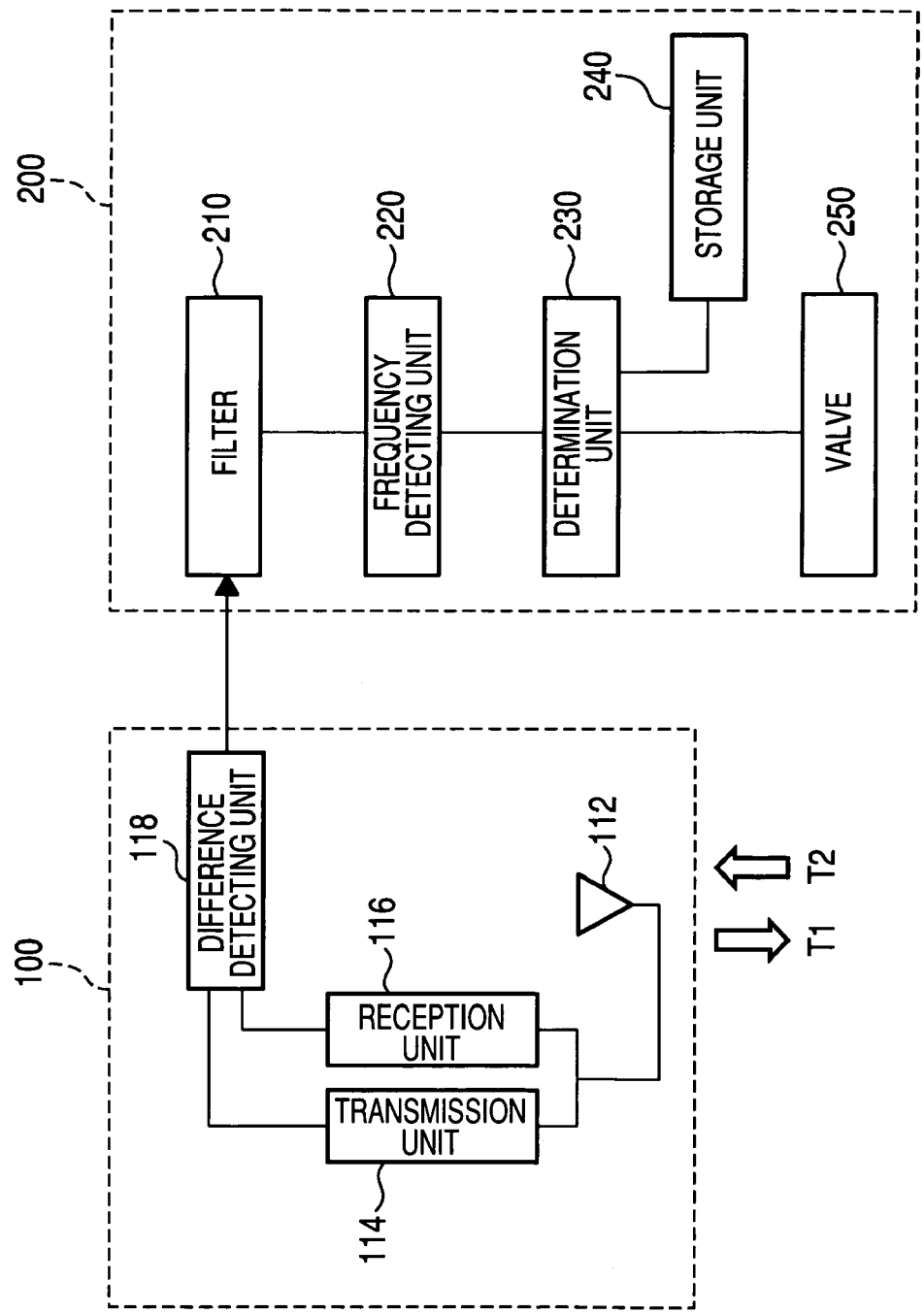

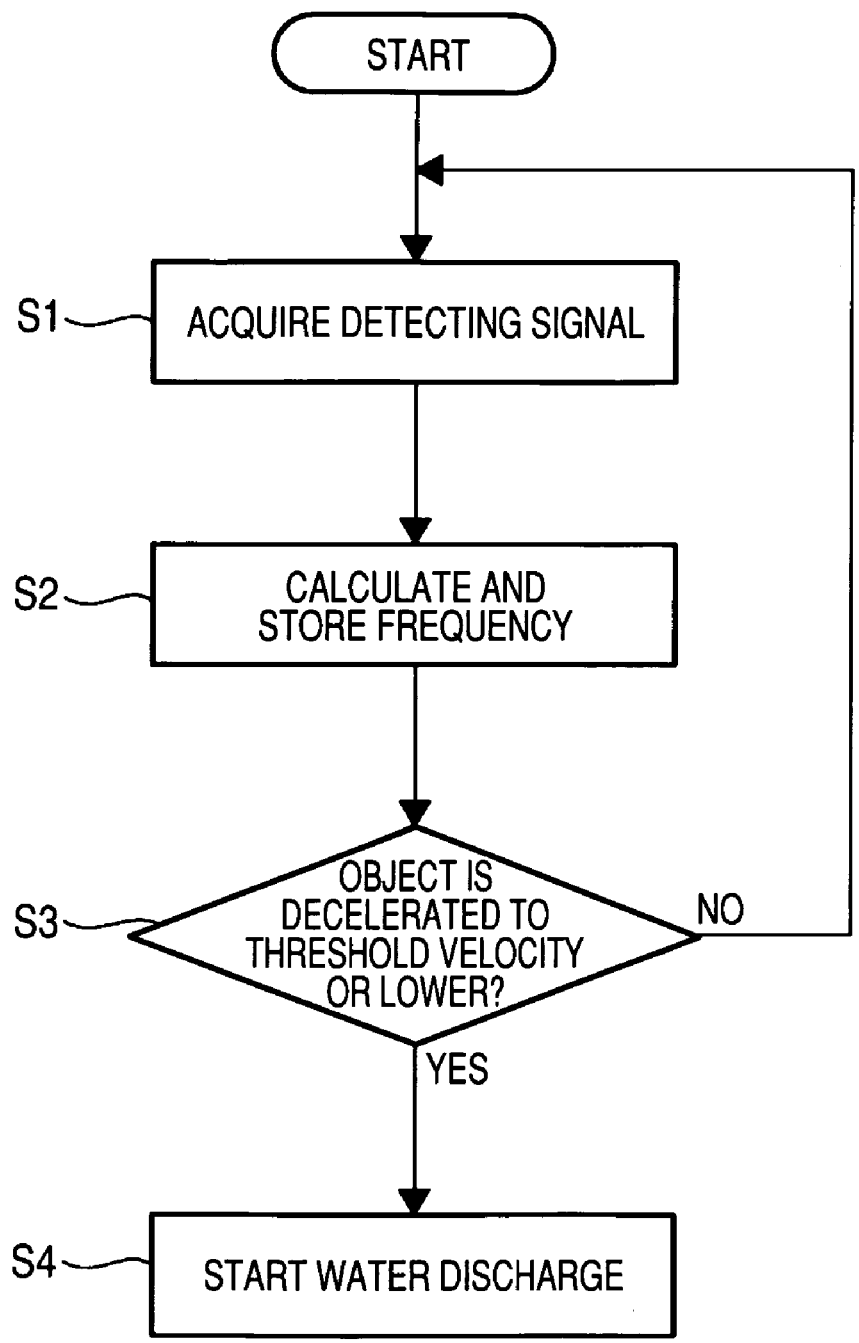

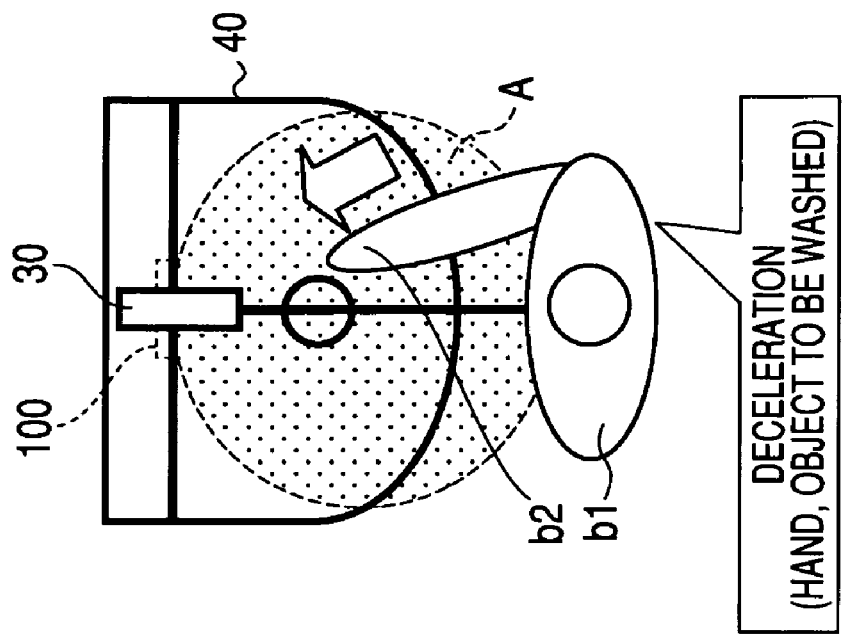
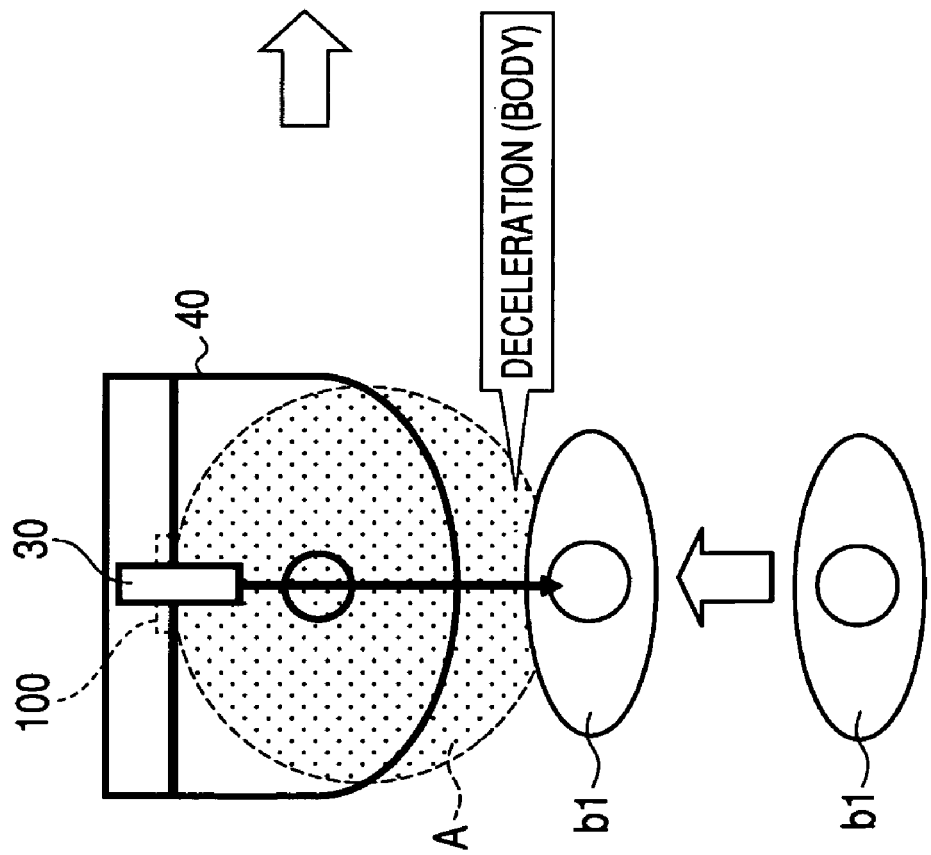

WATER DISCHARGE SYSTEM

This application claims priority from Japanese Patent Application No. 2007-199060, filed on Jul. 31, 2007, and claims the benefit of priority from U.S. Provisional Application No. 61/057,878, filed on Jun. 2, 2008. The entire contents of each of the applications are incorporated by reference herein.

BACKGROUND OF THE INVENTION

1. Technical Field

Systems and devices consistent with the present invention relate to water discharge systems, and more particularly, to a water discharge system that starts water discharge upon detection of an object.

2. Description of the Related Art

A related art water discharge system has been known that automatically starts water discharge by detecting an object, for example when it is detected that the object has reached a destination.

In addition, a related art system has been known in which a detectable range of a sensor is limited, for example, to a region where only a user's hands can be detected, and starts water discharge when the user's hands reach a destination near a spout, thereby preventing erroneous detection of other objects.

In the related art water discharge system, when a transmission wave such as a microwave reaches an object to be detected, a reflected wave (also referred to as a transmitted wave) is generated. The object can be detected by the reflected wave.

For example, JP-A-9-80150 describes a related art object detecting system in which a sensor detects a reflected wave of a radiated microwave from an object, a power spectrum of a Doppler frequency signal thereof is calculated, and a peak value and a threshold value are compared with each other, thereby detecting the object.

However, there are a few disadvantages in the related art. For example, in a case where it is detected that the object, such as a body or user's hands, reaches the destination and then the water discharge is started, there is a disadvantage in that the timing of the water discharge is delayed.

The power spectrum of the Doppler frequency signal depends on a distance to the sensor and an area of the reflecting object. Accordingly, it is difficult to obtain a reflected wave having a sufficient intensity in accordance with a direction of the object placed near the spout, particularly when the object is small, such as a palm, and thus it is difficult to accurately detect the inserted hand.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

It is an aspect of the present invention to provide a water discharge system capable of starting water discharge at an optimum time, according to movement of an object to be detected, just before the object reaches a position under a spout.

According to an aspect of the invention, there is provided a water discharge system. The water discharge system includes a water discharge portion; a sensor unit which radiates an electric wave and acquires information about a movement of an object to be detected, from a reflected wave of the radiated electric wave; and a control unit which controls water discharge of the water discharge portion based on a detecting signal outputted from the sensor unit. When it is detected that the object is decelerated to a first threshold velocity or less, the control unit controls the water discharge portion to start the water discharge.

BRIEF DESCRIPTION OF THE DRAWINGS

FIG. 2 is a block diagram of a sensor unit 100 and a control unit 200 according to an exemplary embodiment of the present invention;

FIG. 8 is a flowchart illustrating a start process for water discharge of the control unit 200 in the first exemplary embodiment of the present invention;

FIGS. 9A and 9B are top views illustrating movement of the object in a second exemplary embodiment of the present invention;

DETAILED DESCRIPTION OF EXEMPLARY EMBODIMENTS OF THE PRESENT INVENTION

Exemplary embodiments of the present invention will be described in detail with reference to the drawings hereinafter.

Figure 1A:
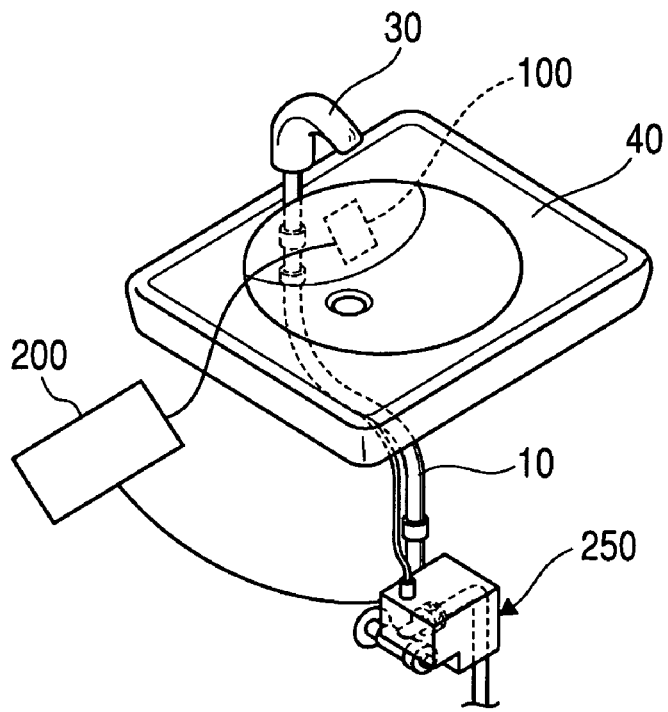
FIGS. 1A and 1B are schematic views illustrating a water discharge system according to a first exemplary embodiment of the present invention.
Figure 1B:
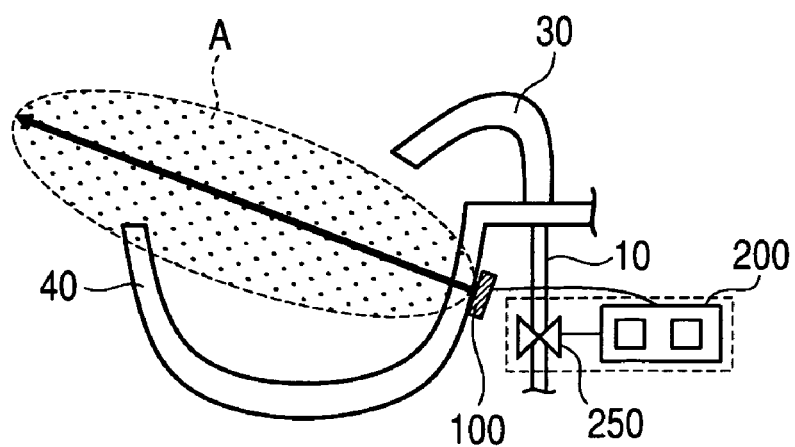

FIGS. 1A and 1B are views illustrating a configuration of a water discharge system according a first exemplary embodiment of the invention. FIG. 1A is a perspective view and FIG. 1B is a side sectional view. The water discharge system includes a sensor unit 100 and a control unit 200 and also includes a water supply hose 10, a spout 30, a water receiving unit 40, and the like. The water receiving unit 40 may be formed of material having low relative permittivity and to which electric wave can be transmitted, such as ceramic material or resin material.

With respect to the other drawings, the same reference numerals and signs are given to the same elements as the elements presented in the previously described drawings, and a detailed description thereof is omitted.

The sensor unit 100 is a high frequency sensor, which radiates (transmits) a high-frequency electric wave such as a microwave or a milliwave, receives a reflected wave of the radiated wave from an object to be detected, detects whether the detected object is in a detectable range A, and outputs a detecting signal.

Figure 3:
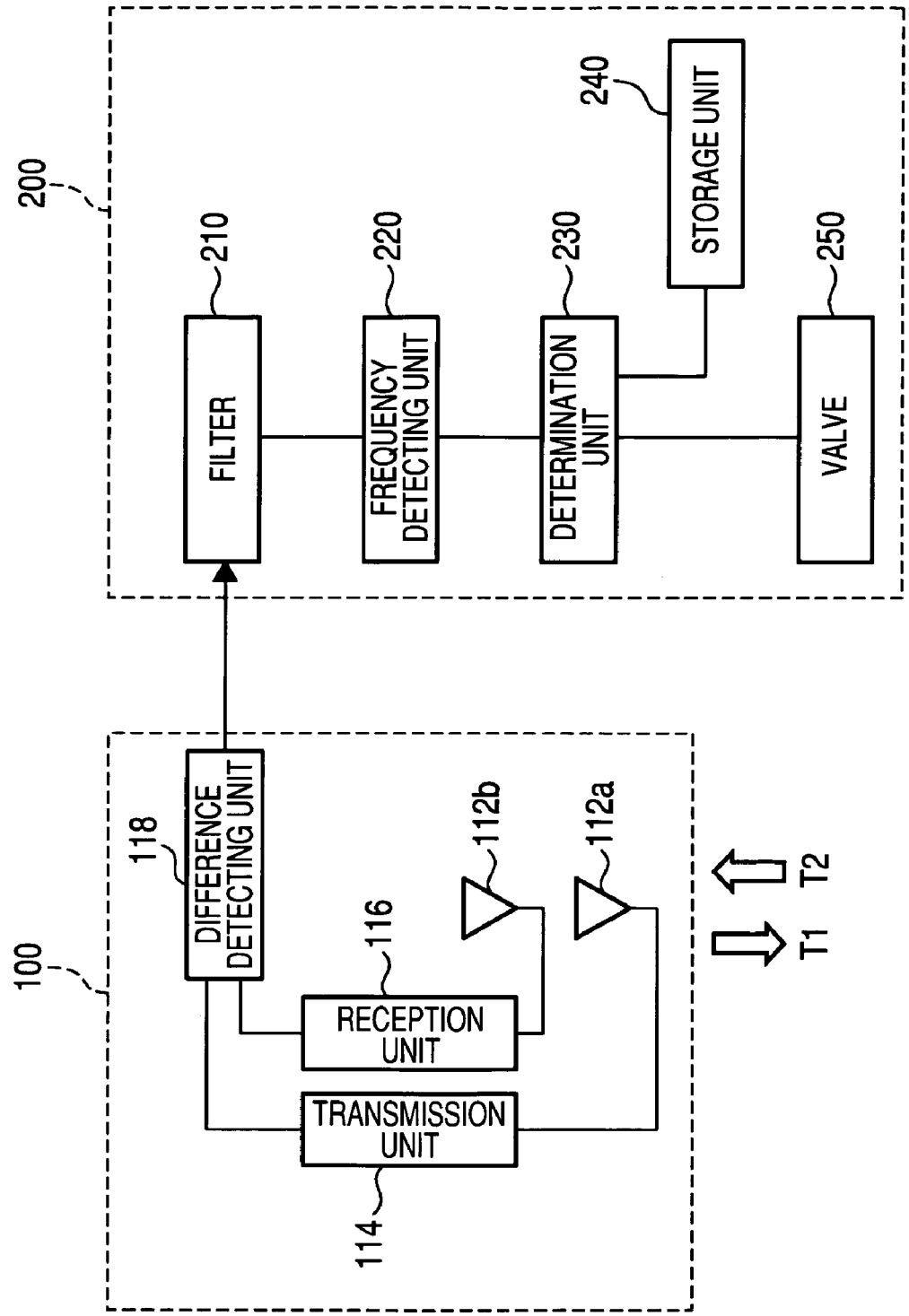
FIG. 3 is a block diagram of the sensor unit 100 and the control unit 200 according to another exemplary embodiment of the present invention.

FIGS. 2 and 3 are block diagrams illustrating exemplary embodiments of the sensor unit 100 and the control unit 200.

As shown in FIG. 2, according to an exemplary embodiment, the sensor unit 100 includes an antenna 112, a transmission unit 114, a reception unit 116, and a difference detecting unit 118. An electric wave in a frequency band of about 10 KHz to about 100 GHz (e.g., a high frequency wave, a microwave, or a milliwave) is radiated from the antenna 112 coupled to the transmission unit 114. Specifically, a transmission wave T1 having a frequency of, e.g., about 10.525 GHz, is radiated from the antenna 112. A reflected wave (also referred to as a transmitted wave) T2 from the object, such as a body, is inputted to a reception unit 116 through the antenna 112. An antenna may be commonly used for both of transmission and reception as shown in FIG. 2. Alternatively, in another exemplary embodiment, an antenna 112a is coupled to the transmission unit 114, and an antenna 112b is coupled to the reception unit 116 as shown in FIG. 3.

A part of the transmission wave and a reception wave are inputted to the difference detecting unit 118, respectively, and then are combined with each other, and an output signal in which the Doppler effect is reflected is outputted. The detection signal outputted from the difference detecting unit 118 is outputted to the control unit 200.

The control unit 200 includes a filter 210, a frequency detecting unit 220, a determination unit 230, a storage unit 240, and a valve 250. In the filter 210, high frequency components are removed from the detection signal outputted from the difference detecting unit 118. In this case, the filtering frequency may be set to 100 Hz. The frequencies of objects which approach or moves away from a water discharge system are not very high, being on the order of about 100 Hz or less. Accordingly, with the filter 210, the object can be precisely detected by removing outside interference.

The detection signal outputted from the difference detecting unit 118 has a waveform in which a high frequency signal overlaps with a low frequency base line. The high frequency component includes information about the Doppler effect. That is, when an object to be detected such as a body moves, a wavelength of a reflected wave is shifted due to the Doppler effect. The Doppler frequency $\Delta F$ (Hz) may be represented by the following formula (1):

$$\Delta F = Fs - Fb = 2 \times Fs \times v/c \qquad (1)$$

Fs: Transmission Frequency (Hz)
Fb: Reflection Frequency (Hz)
v: Velocity of Object (m/s)
c: Velocity of Light ($300 \times 10^6$ m/s)

When the object moves relative to the sensor unit 100, it is possible to obtain an output signal including a frequency $\Delta F$ in proportion to the velocity v as shown in Formula (1). The output signal has a frequency spectrum, and there is a correlation between a peak frequency corresponding to a peak of the spectrum and the velocity v of the moving object. Accordingly, it is possible to calculate the velocity v by measuring the Doppler frequency $\Delta F$.

Figure 4A:
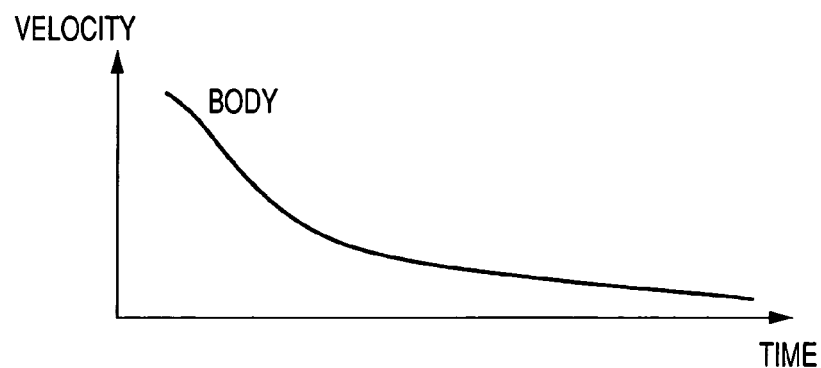
FIGS. 4A to 4C are diagrams illustrating characteristics of a detecting signal output from a sensor unit 100 in the first exemplary embodiment of the present invention.
Figure 4B:
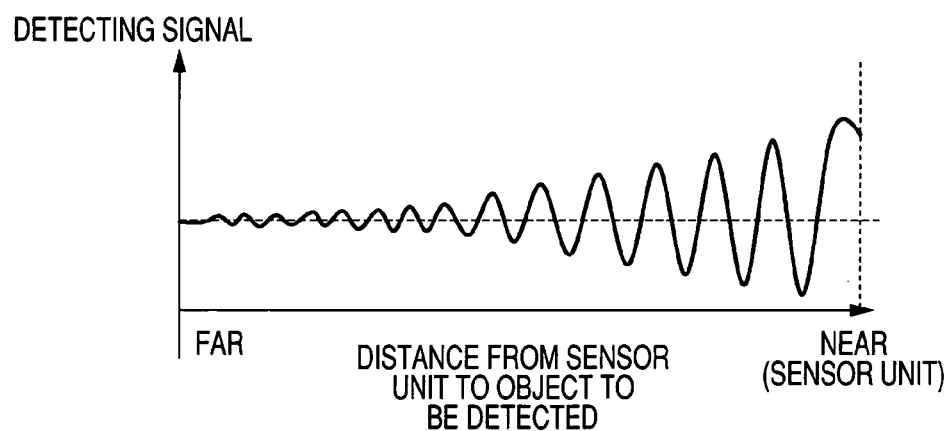
Figure 4C:
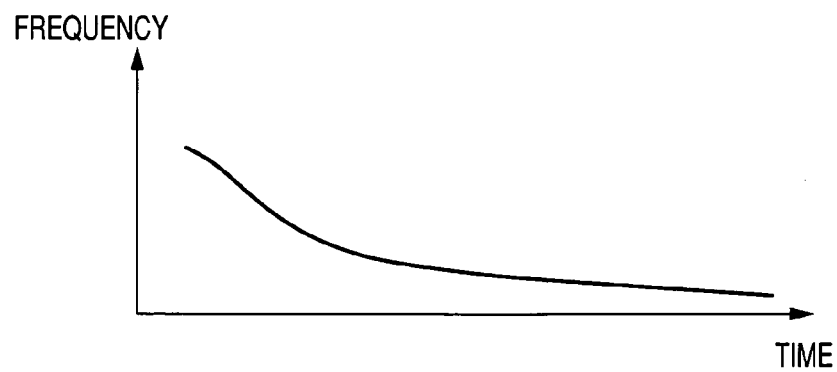

FIGS. 4A to 4C are diagrams illustrating characteristics of the detecting signal outputted from the fitter 210.

FIG. 4A shows an example of a velocity characteristic of an object with respect to time. The velocity is reduced over time. This is because the object tends to slowly reach the target destination. For example, a velocity of a user's body decreases as the user moves closer to a water discharge system, e.g., a faucet apparatus, and stops at a position of use. Similarly, a velocity of a user's hands decreases as in a case where the user stops at the position of use and inserts his hands under the spout or near the spout and comes close to a destination. On the contrary, when the object moves away from the destination, the velocity increases as the object moves away from the destination.

FIG. 4B is a diagram illustrating an amplitude (i.e., a voltage value) of a detecting signal, which is output from the filter 210, with respect to a distance of the object, such as user's body, from the sensor unit 100. The amplitude of the detecting signal increases as the object comes closer to the sensor unit 100 and the reflected wave from the detecting object gets larger.

In contrast, when the object moves away from the sensor unit 100, the amplitude of the detecting signal becomes gradually smaller.

FIG. 4C is a diagram illustrating a frequency change of the detecting signal when a velocity of the object is reduced as shown in FIG. 4A. As can be seen from FIGS. 4A and 4C, the frequency of the detecting signal is changed according to the velocity of the object, and the frequency of the detecting signal is reduced when the object is decelerated.

Accordingly, it is possible to detect the velocity of the object based on the frequency of the detecting signal, and it is possible to detect the deceleration of the object based on a decrease in frequency of the detecting signal. In contrast, it is possible to detect the acceleration of the object based on an increase in frequency of the detecting signal. In the present exemplary embodiment, for example, the determination unit 220 (FIGS. 2 and 3) performs this determination.

Figure 5A:
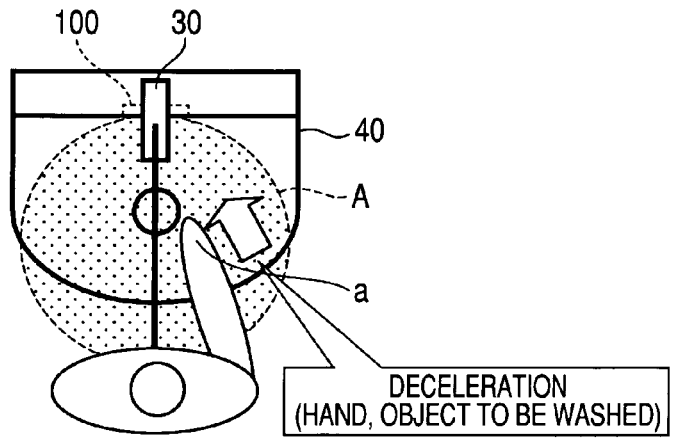
FIGS. 5A to 5C are diagrams illustrating movement of an object to be detected in the first exemplary embodiment of the present invention.
Figure 5B:
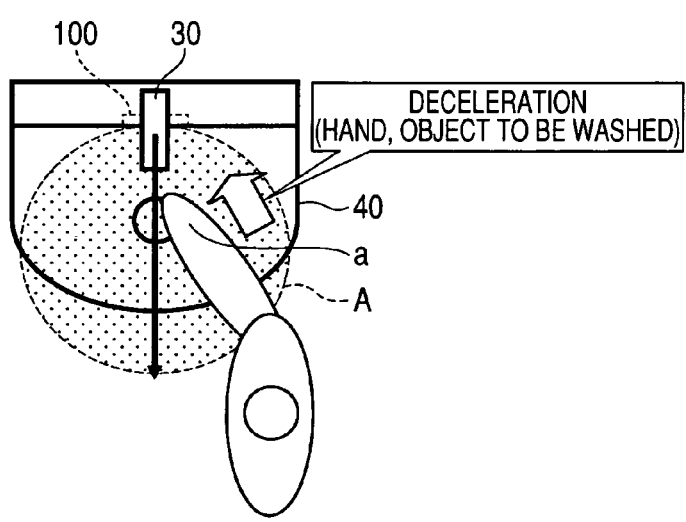
Figure 5C:
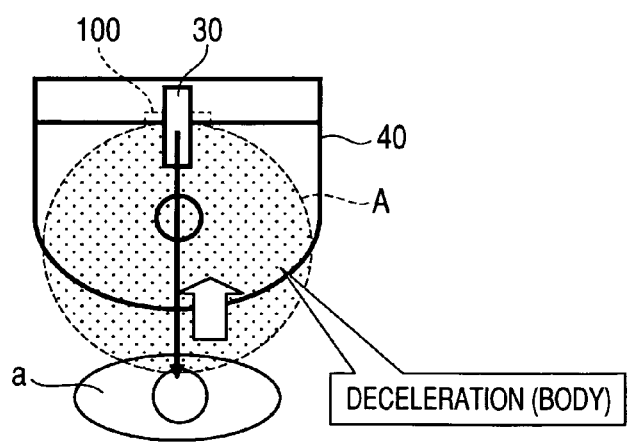

FIGS. 5A to 5C are diagrams illustrating movement of the object. FIGS. 5A and 5B show a case that it is detected that an object to be detected "a" is decelerated to a threshold velocity or less, wherein an object to be washed (e.g., a hand, a toothbrush, and a cup held by the hand) is set as the object "a". FIG. 5A shows a state in which a user's body is in a detectable range A of the sensor unit 100. FIG. 5B shows a state that the user's body is not in the detectable range A of the sensor unit 100. Generally, the object moves closer to the water discharge system from a position away from the water discharge system. When the object comes close to a usable position, the object decelerates and then stops before the water discharge system. For example, in FIGS. 5A and 5B, the user's body comes close to the automatic water discharge system and is decelerated.

FIG. 5C shows a case that the deceleration of the object "a" coming close to the sensor unit 100 is detected, wherein the user's body is set as the object "a". Also, in this case, the user's body is decelerated when coming close to the water discharge system, and the user's body stops at the position at which the water discharge system is usable.

In the present exemplary embodiment, water discharge is controlled by detecting a deceleration at the time when the object, e.g., the user's body or hand, comes close to the water discharge system as described above. Namely, the water discharge is controlled by detecting the deceleration at the time when the object comes closer to the water discharging portion, that is, at the time when the object comes closer to a destination such as a water receiving unit 40, a position under the spout 30, a position on a trace of water discharging flow, or a water falling position from the spout 30 to the water receiving unit 40.

Figure 6:
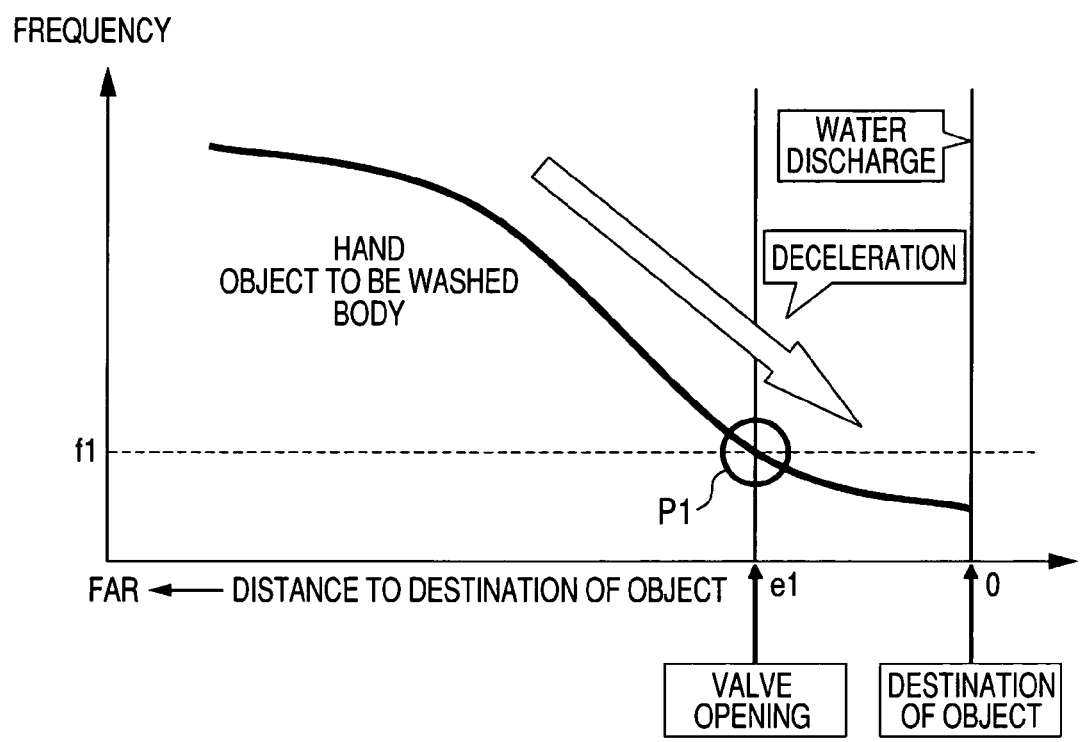
FIG. 6 is a diagram illustrating an example of frequency change of the detecting signal with respect to a distance to a target destination of the object in the first exemplary embodiment of the present invention.

FIG. 6 shows a graph illustrating an example of frequency change of the detecting signal with respect to a distance to a target destination of an object to be detected.

As shown in FIG. 6, when the object (e.g., user's hand, object to be washed, body) moves and then reaches the target destination, the velocity of the object decreases as the object comes closer to the destination, and thus the frequency of the detecting signal decreases. When the object finally reaches the position just before the destination, the frequency of the detecting signal becomes a threshold frequency f1 or less. In case of the user's hands or the object to be washed, the target destination is, for example, the vicinity of the spout 30. In case of the body, the target destination is, for example, a position in front of the water discharge system.

Whether the object is a user's hands, an object to be washed (FIG. 5A or 5B), or a body (FIG. 5C), the object decelerates when coming closer to the destination in the detectable range A of the sensor unit 100.

For example, as shown in FIG. 6, when the object moves into the detectable range of the sensor unit 100 and a distance from the destination is "e1", a frequency of the detecting signal outputted from the sensor unit 100 to the control unit 200 with respect to the object becomes a threshold value f1 (see point "p1" in FIG. 6). At this timing, the determination unit 230 opens the valve 250 to start water discharge.

Then, the object is further decelerated and reaches the destination. However, the determination unit 230 controls the timing of water discharge by opening the valve 250 at the time the object reaches the position just before the destination "e1". Therefore, the water discharge can be started without delay when the object reaches the destination.

As described above, in the first exemplary embodiment, when it is detected that the object is decelerated to a threshold velocity "v1" or less, it is determined that the object reaches the position just before the target destination, and the water discharge is started.

Accordingly, since the water discharge is started at the same time as the detecting object reaches the destination, the use of the water discharge system becomes comfortable.

FIGS. 7A to 7E are side views illustrating examples of an object in the first exemplary embodiment of the present invention.

Figure 7A:
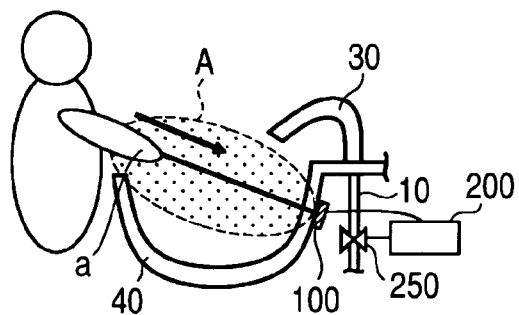
FIGS. 7A to 7E are side views illustrating an example of the object in the first exemplary embodiment of the present invention.

As shown in FIG. 7A, a user's hands are set as an object to be detected "a". When it is detected that the hands are decelerated to the threshold velocity v1 or less, it is determined that the hands reach the position just before the destination (e.g., under the spout 30 or on the trace of water discharging flow), and then the water discharge is started.

Figure 7B:
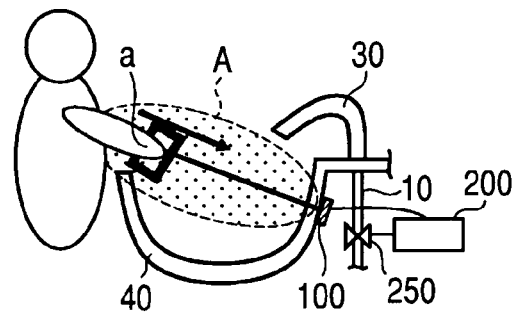

As shown in FIG. 7B, a hand holding an object to be washed (e.g., a toothbrush and a cup) is set as an object to be detected "a". Even though there may be an object to be washed which is difficult to detect, the movement or velocity of the object is the same as the velocity of the hand holding it. Accordingly, with respect to the timing to start water discharge to wash an object which is difficult to detect, when it is detected that the hand holding the object is decelerated to the threshold velocity "v1" or less, it is determined that the object reaches the position just before the destination (e.g., under the spout 30 or on the trace of water discharging flow), and then the water discharge is started.

Figure 7C:
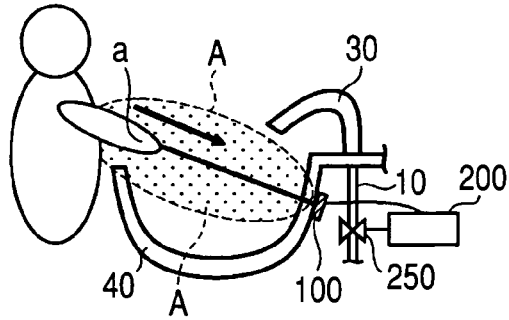

As shown in FIG. 7C, an object to be washed such as a toothbrush or a cup is set as an object to be detected "a". As part of the object to be washed such as the toothbrush or cup, there may be an object that can be easily detected by the sensor unit 100.

Thus, the above object to be washed is set as an object to be detected "a". With respect to the start timing of water discharge to wash the object, when it is detected that the object is decelerated to the threshold velocity v1 or less, it is determined that the object reaches the position just before the destination under the spout 30, near the spout 30 or on the trace of water discharging flow, and then the water discharge is started.

Figure 7D:
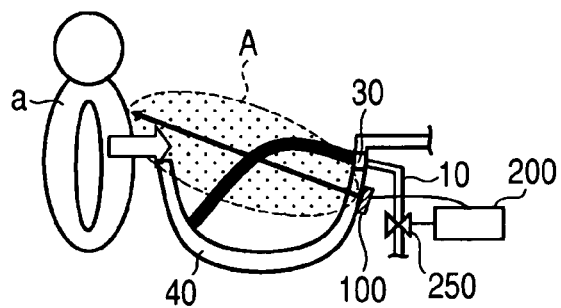

As shown in FIG. 7D, a user's body is set as an object to be detected "a" when the spout 30 does not protrude into the water receiving unit 40. As shown in FIG. 7D, in the case in which it is difficult to see the spout 30 (e.g., when the spout 30 does not protrude to the water receiving unit 40), it is difficult to know how water is discharged and thus it is difficult for a user to know where to put his hands with respect to the water receiving unit 40.

In such a case, the user's body is set as an object to be detected "a". When it is detected that the body is decelerated to the threshold velocity v1 or less, the valve 250 is opened to start water discharge in a momentary or continuous manner.

Accordingly, since the user can see the trace of water discharging flow, the user can put his hands in the water receiving unit 40 without hesitation.

Figure 7E:
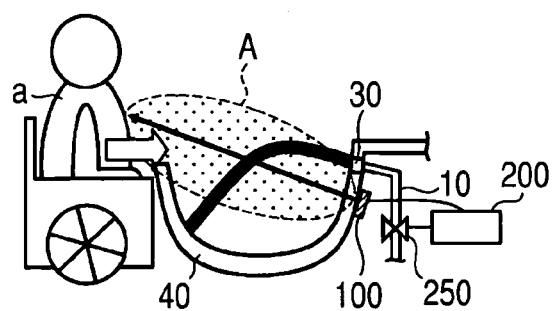

As shown in FIG. 7E, a user's body is set as an object to be detected "a" when the user sits in a wheelchair. As shown in FIG. 7E, in cases in which it is difficult for the user to put his hands inside the water receiving unit 40 (e.g., when the user sits on the wheelchair), the body is set as an object to be detected "a" as in the above description. In this case, when it is detected that the body is decelerated to the threshold velocity v1 or less, the valve 250 is opened to discharge water in a momentary or continuous manner in advance.

A user such as a person sitting in a wheelchair needs only to hold out his hands or a cup at the position where water is being discharged. Therefore, water discharge is started without holding out the hands to the inside of the water receiving unit 40, and thus the user can use it in a comfortable position.

FIG. 8 is a flowchart illustrating a process for starting water discharge with the control unit 200 according to the first exemplary embodiment of the present invention.

The control unit 200 acquires a detecting signal from the sensor unit 100 (Operation S1), and the control unit 200 calculates and stores a frequency of the object from the detecting signal (Operation S2).

In this case, for example, a frequency having the largest amplitude in the frequency band (0 to 100 Hz) of the detecting signal is calculated as a frequency of the object to be detected.

Next, the control unit 200 determines whether the object is decelerated to a threshold velocity v1 or less based on the calculated frequency of the object (Operation S3).

In Operation S3, the deceleration of the object is determined by comparing the frequency of the object calculated at this time with a frequency of the object that was calculated at a former time or with a threshold value f1. The threshold value f1 may be preset.

As a process for the deceleration determination, for example, when the frequencies of the object calculated at the former time and the former time before last are over the threshold value f1 and the frequency calculated at this time is the threshold value f1 or less (i.e., when the frequency is lower than the frequency of the detecting signal at the former time), it is determined that the object is decelerated to the threshold velocity v1 or less. Otherwise, the velocity of the object is over the velocity v1. Accordingly, it is determined that the object is not decelerated to the velocity v1 or less. The frequencies calculated at the former time and the former time before last can be read out by storing them in the storage unit 240 (see FIGS. 2 and 3).

As a result, when it is determined that the object is not decelerated to the threshold velocity v1 or less (Operation 3: NO), the process returns to Operation S1 and then a detecting signal is acquired again.

When it is determined that the object is decelerated to the threshold velocity v1 or less (Operation S3; YES), the valve 250 is opened to start water discharge (Operation S4).

According to the first exemplary embodiment described above, when it is detected that the object is decelerated to the threshold velocity or less, the water discharge is started. Accordingly, water discharge is stared at the same time when the object reaches the target destination.

Next, a second exemplary embodiment of the present invention will be described.

In a case where there are multiple objects moving, such as approach of a body and insertion of a hand or a cup (for example, in a case where a user approaches the water discharge system and then holds out a hand, a cup, or the like), a plurality of decelerations, including a deceleration of the body and a deceleration of the hand are detected.

Thus, in the second exemplary embodiment of the present invention, when a first deceleration is detected, the deceleration is determined as the deceleration of the body and the water discharge is not started. Subsequently, when the second deceleration is detected, the deceleration is considered as the deceleration of the hand or the object to be washed and then the water discharge is started.

That is, the first object detected is considered as the body and the second object detected is considered as the hand, the cup, or the like. When it is detected that the first object is decelerated to a first threshold velocity (v2) or less and then it is detected that the second object is decelerated to a second threshold velocity (v3) or less, the determination unit 230 determines that the second object reaches the position just before the target destination and then starts water discharge.

Accordingly, it is possible to identify an approach of the body and an insertion of the hand, the cup, or the like. Further, water discharge is not started according to only the approach of the body. The water discharge is started at the same time when the hand or the object reaches the destination (e.g., under the spout or on the trace of water discharging flow). Thus, wasteful water discharge can be saved, and efficiency may be increased.

FIGS. 9A and 9B are top views illustrating movement of the object to be detected in the second exemplary embodiment of the present invention. For example, a user comes close to the water discharge system and makes a series of movements such as holding out a hand or an object to be washed (e.g., toothbrush or cup) held by the hand.

As shown in FIG. 9A, the user who is a first object to be detected (body) "b1" walks and comes close to the water discharge system. The user decelerates as he comes close to the water discharge system, and reaches a destination in front of the water discharge system. As shown in FIG. 9B, the user moves a hand or an object to be washed, which is a second object to be detected "b2". The hand or the object is decelerated as it comes closer to the water discharging portion. That is, the second object "b2" is decelerated as it comes closer to a destination such as a water receiving unit 40, a position under the spout 30, a position on a trace of water discharging flow, or a water falling position from the spout 30 to the water receiving unit 40.

Figure 10:
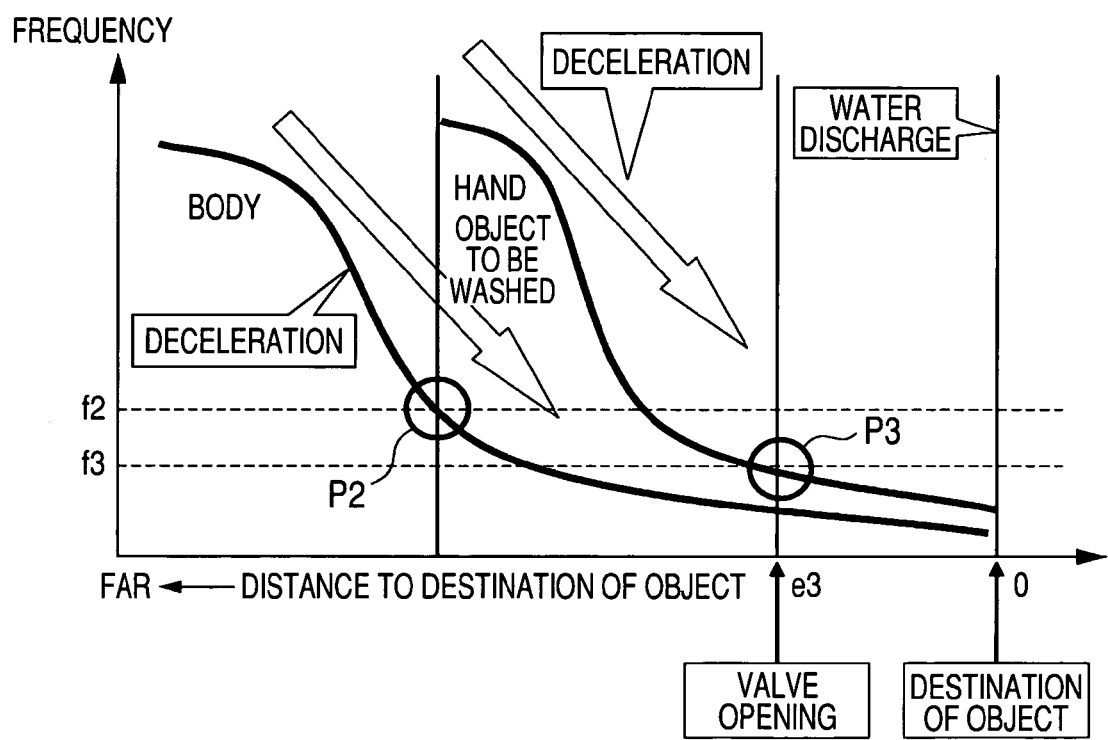
FIG. 10 is a diagram illustrating an example of frequency change of the detecting signal with respect to a distance to the target destination of the object in the second exemplary embodiment of the present invention.

FIG. 10 is a diagram illustrating an example of frequency change of a detecting signal with respect to a distance to a target destination of an object to be detected. In the example, it is considered that the destination is a position under the spout 30 or on the trance of water discharging flow, which is the destination of the second object (user's hand, etc.)

As shown in FIG. 10, the velocity of the first object (e.g., the user's body) decreases as the user moves and comes closer to the water discharge system. Thus, the frequency of the detecting signal is decreased. Finally, when the first object reaches the position just before the water discharge system, the user decelerates to the first threshold velocity v2 or less and the frequency thereof decreases to a threshold frequency f2 or less (see point "p2" in FIG. 10). When the velocity of the user is v2 and the frequency of the detecting signal is f2, the distance of the user from the destination of the second object is e2.

Then, when the user moves the user's hand, the velocity of the second object (user's hand, etc.) decelerates as the second object comes closer to the destination in the same manner as the case of the user's body. Finally, when the second object reaches the position just before the destination, the user's hand decelerates to a second threshold velocity v3 or less and the frequency of the detecting signal decreases to a threshold frequency f3 or less. When the velocity of the second object (user's hand, the object to be washed) is v3 and the frequency of the detecting signal is f3, the distance of the second object from the destination is e3 (<e2). The magnitude relation of the threshold velocities v2 and v3 or the magnitude relation of the threshold frequencies f2 and f3 is not limited to the example shown in FIG. 10, which may be substantially equal to each other or may be a magnitude relation opposite to the example shown in FIG. 10.

In the second exemplary embodiment, the valve 250 is opened at the time when the second object is decelerated to the velocity v3. Accordingly, it is possible to start water discharge at the time when the second object (e.g., user's hand, an object to be washed) reaches the destination (e.g., under the spout 30 or on the trance of water discharging flow).

Figure 11:
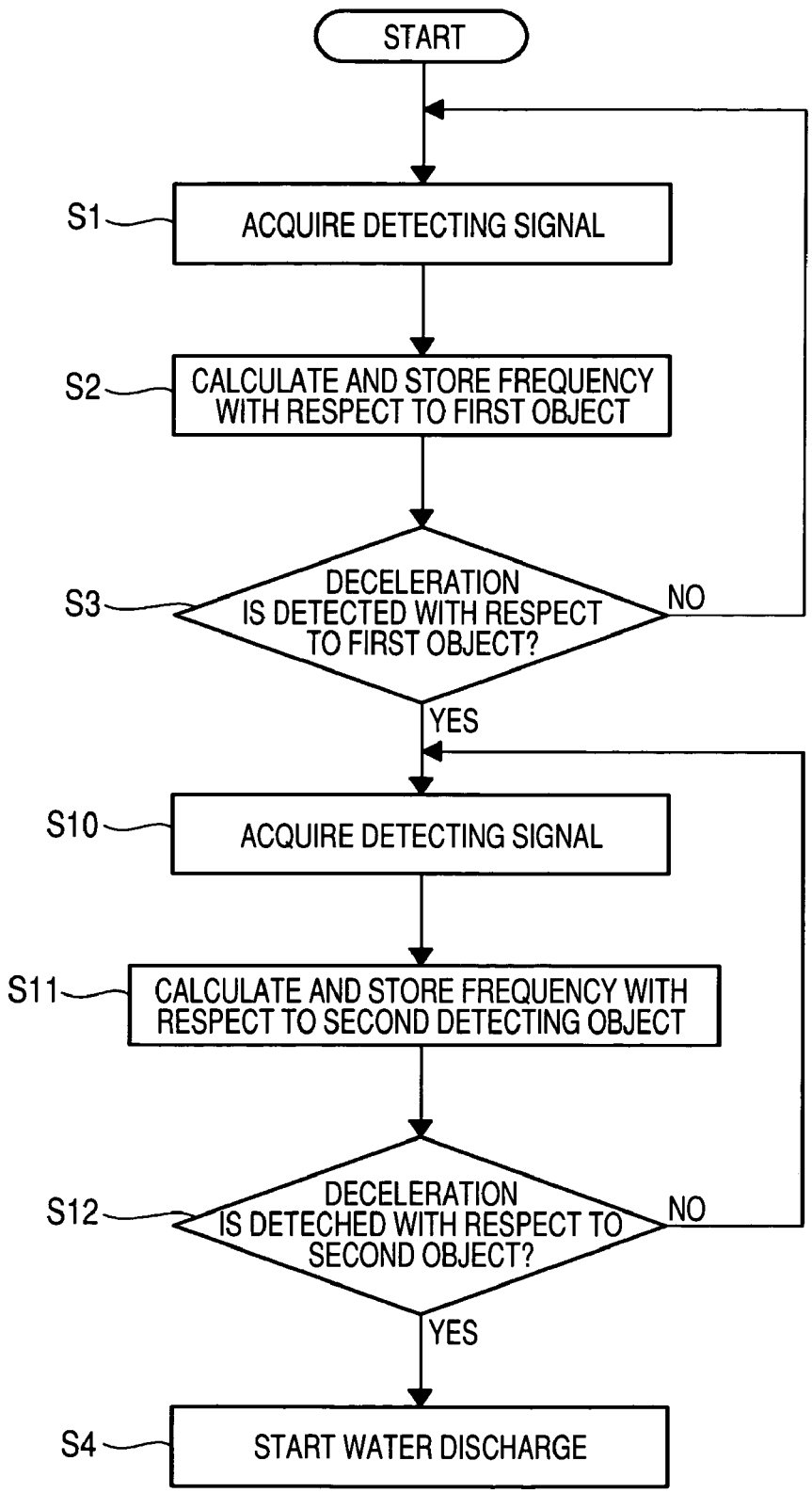
FIG. 11 is a flowchart illustrating a start process for water discharge of the control unit 200 in the second exemplary embodiment of the present invention.

FIG. 11 is a flowchart illustrating a process for starting water discharge using the control unit 200 in the second exemplary embodiment of the present invention.

The control unit 200 acquires a detecting signal from the sensor unit 100 (Operation S1), the control unit 200 calculates a frequency of the first object from the detecting signal, and the frequency is stored in the storage unit 240 (Operation S2).

In this case, for example, a frequency having a peak value of amplitude in a frequency band (0 to 100 Hz) of the detecting signal is set as the frequency of the first object.

Then, the determination unit 230 determines whether the first object (e.g., the body) is decelerated to the threshold velocity v2, based on the frequency of the calculated first object (Operation S3).

The deceleration of the first object is determined by comparing the frequency of the first object calculated at this time with a frequency of the first object that was previously calculated at the former time or with a threshold value f2. The frequency of the first object previously calculated at the former time or the threshold value f2 may be stored in the storage unit 240 (see FIG. 2, FIG. 3).

As the process for the deceleration determination in this case, for example, when the frequency of the first object calculated at the former time and the former time before last is over the threshold value f2 and the frequency of the first object calculated at this time is the threshold value f2 or less (lower than the frequency at the former time), it is determined that the first object is decelerated to the velocity v2 or less (the first deceleration is detected). Otherwise, it is determined that the first object is not decelerated to the velocity v2 or less (the first deceleration is not detected).

As a result, when it is determined that the first object (body) is not decelerated to the velocity v2 or less and the first deceleration is not detected yet (Operation S3: NO), the process returns to Operation S1 and then a detecting signal is acquired again.

When it is determined that the first object is decelerated to the velocity v2 or less and the first deceleration is detected (Operation S3: YES), the control unit 200 stores that the first deceleration is detected and then proceeds to Operation S10.

The control unit 200 acquires a detecting signal again in Operation S10, and a frequency of the second object (e.g., user's hand, cup held by the hand, etc.) is calculated at this time based on the acquired detecting signal (Operation S11).

In this case, after detecting the first deceleration, the frequency of determination is changed from the frequency of the first object to the frequency of the second object. Thus, since the frequency of the first object is already the first threshold value f2 or less, when the frequency of the second object is firstly calculated after detecting the first deceleration, for example, a frequency having the largest amplitude in a frequency band higher than the frequency f2 of the detecting signal is continuously detected as the frequency of the second object.

Then, the determination unit 230 determines whether the second object (e.g., a hand or an object to be washed) is decelerated to a threshold velocity v3 or less (Operation S12).

The deceleration of the second object may be determined, for example, by comparing the frequency of the second object detected at this time with the frequency of the second object that was previously detected at the former time or with a threshold value f3.

It is determined whether the second object (a hand or a cup) is decelerated to the velocity v3 or less in a similar manner as the determination of the first deceleration of the body (Operation S12). However, the frequency f3 is used as the threshold value of the frequency.

As the process for the determination of the second deceleration detecting, for example, when the frequency of the second object detected at the former time or the former time before last is over the threshold value f3 and the frequency of the second object detected at this time is the threshold value f3 or less (lower than the frequency at the former time), it is determined that the second object is decelerated to the velocity v3 or less (the second deceleration is detected). Otherwise, it is determined that the second object is not decelerated to the velocity v3 or less (the second deceleration is not detected).

As a result, when it is determined that the second object (e.g., a hand or an object to be washed) is not decelerated to the velocity v3 or less and the second deceleration is not detected yet (Operation S12: NO), the process returns to Operation S10 and then a detecting signal is acquired again.

When it is determined that the second object is decelerated to the velocity v3 or less and the second deceleration is detected (Operation S12: YES), the control unit 200 opens the valve 250 to start water discharge (Operation S4).

According to the second exemplary embodiment, the plurality of decelerations, including the deceleration of the first object (e.g., a user's body) and the deceleration of the second object (e.g., a user's hand or an object to be washed held by the hand) are detected, and the water discharge is started based on the plurality of detections. Accordingly, the water discharge is started at the same time when the hand or the object to be washed reaches the target destination by discriminating the body, and the hand or the object to be washed. Therefore, wasteful water discharge can be saved, and the water discharge may be made more efficient.

Next, there will be described a method of respectively determining the first object and the second object by observing the amplitude of the detecting signal for each frequency.

Figure 12:
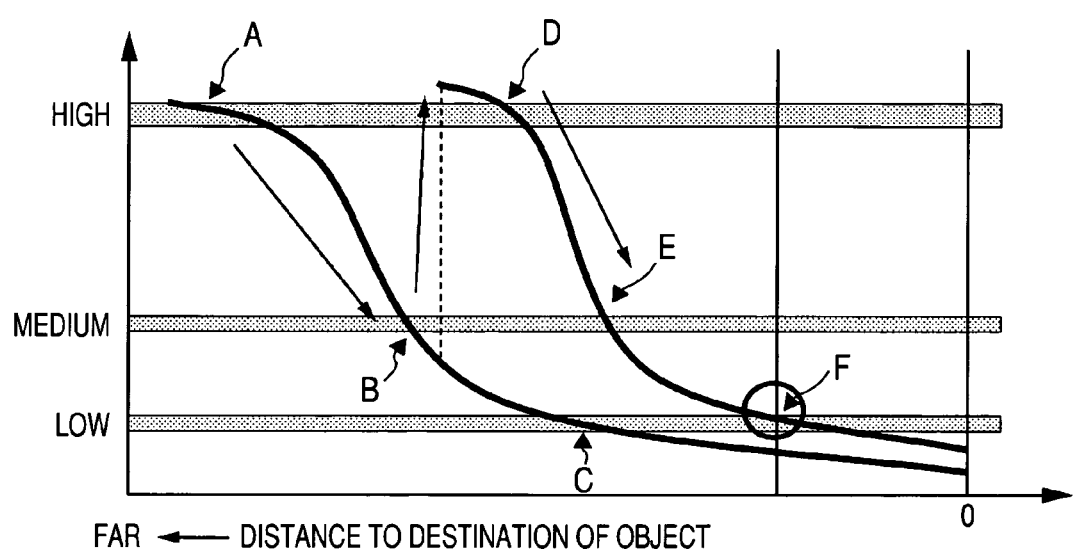
FIG. 12 is a schematic diagram illustrating a method for observing the detecting signal for each frequency band in the example shown in FIG. 10.

FIG. 12 is a schematic diagram illustrating a method of observing a detecting signal for each frequency band in the example shown in FIG. 10.

Frequencies of detecting signals of the first object and the second object are changed over time as shown in FIG. 12. In the other words, the amplitude of the detecting signals in different frequency bands is sequentially represented over time. For example, as shown in FIG. 12, it is possible to observe the amplitude of the detecting signals in a high frequency band, a medium frequency band, and a low frequency band. Specifically, it is possible to carry out this observation by filtering the detecting signal through a digital filter corresponding to each frequency band.

Figure 13:
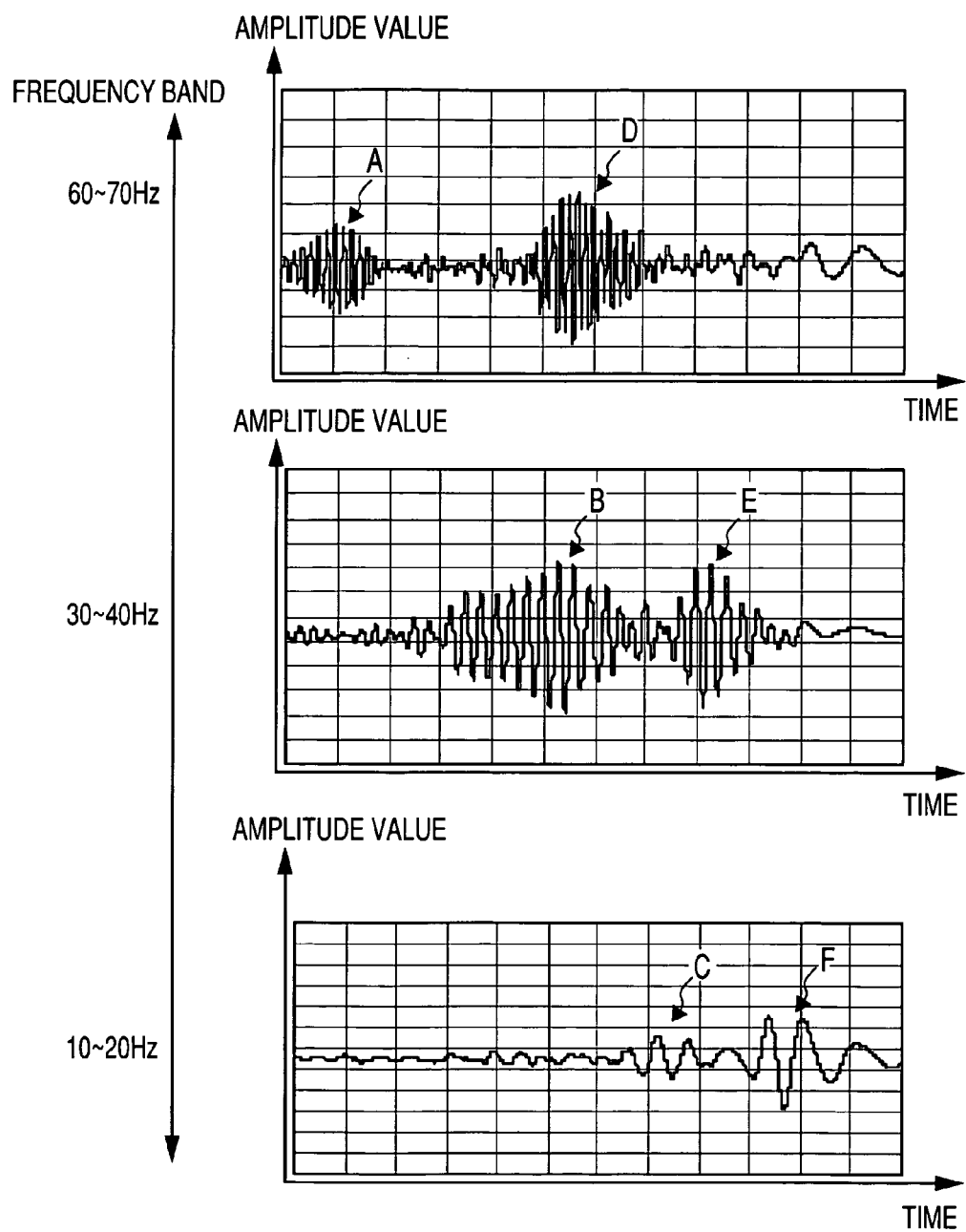
FIG. 13 is a graph illustrating an example of a measured value of amplitude of the detecting signal with respect to time change in the example shown in FIG. 12.

FIG. 13 is a graph illustrating an example of a measured value of an amplitude of the detecting signal with respect to a change in time in the example shown in FIG. 12. In FIG. 13, time changes in the amplitude of detecting signals are represented in 60 to 70 Hz as the high frequency band, 30 to 40 Hz as the medium frequency band, and 10 to 20 Hz as the low frequency band.

As shown in FIG. 12, detecting signals of the first object and the second object pass through frequency bands in points A to F, respectively. In FIG. 13, these points can be clearly observed as increases in amplitude of the detecting signals in the frequency bands. Namely, acceleration or deceleration of the first object and the second object can be discriminated by observing the amplitude of the detecting signals in each frequency band as described above.

In addition, when the amplitude is observed in each frequency band, the discrimination can be performed, for example, in the case that the user's body and hand approach the water discharge system substantially at the same time.

Figure 14:
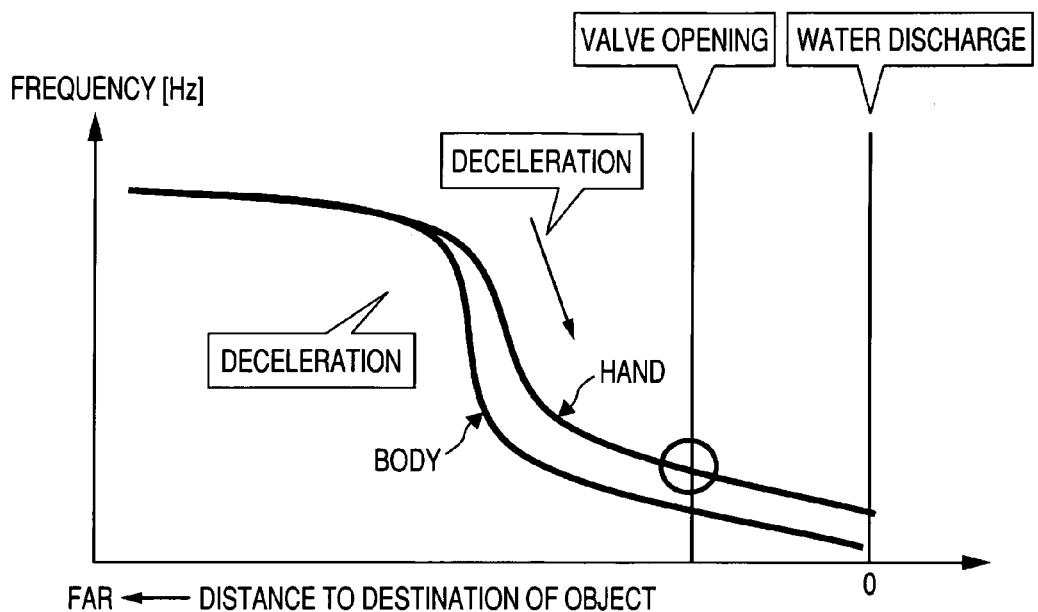
FIG. 14 is a schematic diagram illustrating a second example of a frequency change of a detecting signal with respect to a distance to a target destination of the object.

FIG. 14 is a schematic diagram illustrating a second example of a frequency change of a detecting signal with respect to a distance to a target destination of the object.

In the example, a first object to be detected (e.g., a user's body) approaches a water discharging portion of a water discharge system and the user relatively slowly holds out a second object to be detected (e.g., a hand or a cup). As shown in FIG. 14, the time of the deceleration of the first object and the time of the deceleration of the second object may be close to each other.

Figure 15:
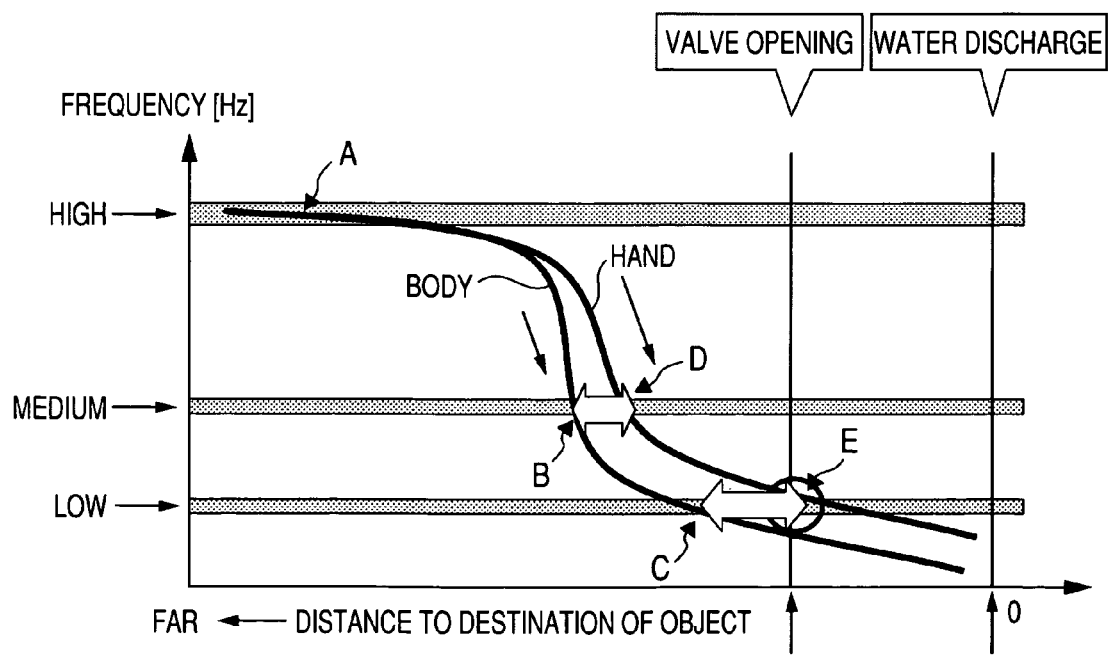
FIG. 15 is a schematic diagram illustrating observation by division for each frequency band in the example shown in FIG. 14.

FIG. 15 is a schematic diagram illustrating observation by division for each frequency band in the example shown in FIG. 14. Also in this case, amplitude of the detecting signals can be observed with respect to a high frequency band, a medium frequency band, and a low frequency band.

Figure 16:
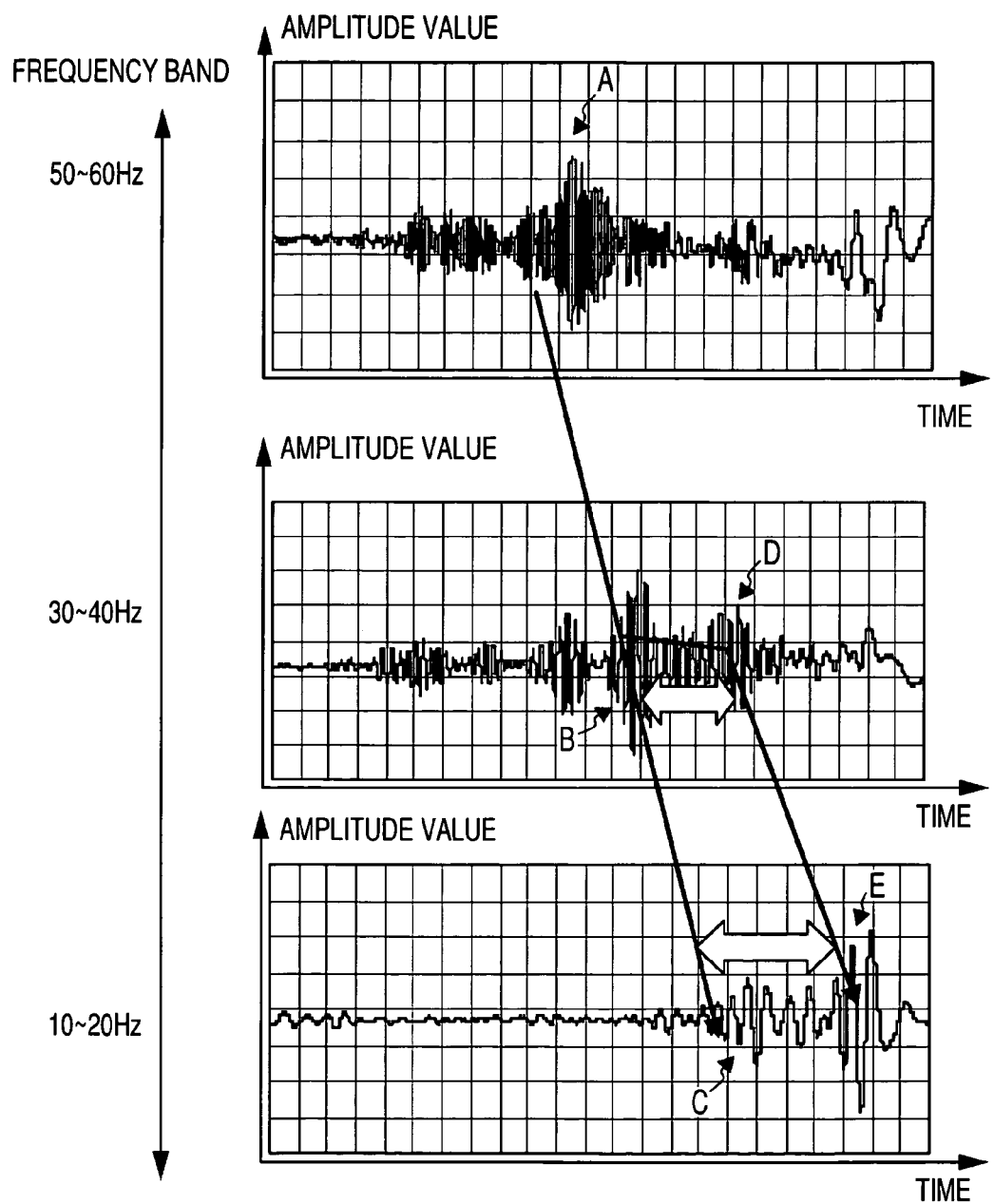
FIG. 16 is a graph illustrating a measured value of amplitude of the detecting signal with respect to time change in each frequency band, according to the example shown in FIG. 14.

FIG. 16 is a graph illustrating a measured value of amplitude of a detecting signal with respect to change in time in each frequency band, according to the example shown in FIG. 14.

In a point A (see FIG. 15) which is away from the water discharging portion, the velocities of the first object (e.g., the body) and the second object (e.g., a hand or cup, etc.) are close to each other, and the user does not start movement of holding out the hand or the like yet. Accordingly, in 50 to 60 Hz, it is observed that the amplitude according to the first object and the amplitude according to the second object overlap with each other.

When the user approaches the water discharge portion, the user starts the movement of holding out the hand or the cup to the water discharge portion while decelerating the body. At this time, the frequency of the first object is relatively rapidly decreased, but the frequency of the second object is relatively slowly decreased due to the holding out the hand or the like. This is observed separately as the amplitude of the point B and the amplitude of the point D in the frequency band of 30 to 40 Hz.

As the user continues to approach the water discharging portion, the velocity of the body is considerably decreased and then the body stops. Subsequently, the velocity of the hand or the cup is decreased, and finally, the hand or the cup stops. These movements are observed clearly separately as the amplitude of the point C and the amplitude of the point E in the frequency band of 10 to 20 Hz. At this time, since the user's hand, the cup, or the like is close to the water discharging portion (i.e., sensor unit 100) as compared with the body, the amplitude of the detecting signal of the second object relatively becomes larger.

As described above, it is possible to separately observe the movements of the first object and the second object by respectively observing time changes in the amplitudes of the detecting signals in the plurality of frequency bands, even in the case that the timing of the deceleration of the first object and the timing of the deceleration of the second object are close to each other. At the time of this observation, it is possible to clearly separate the first object and the second object by considering also magnitudes of the amplitude.

Next, a third exemplary embodiment of the present invention will be described. In the third exemplary embodiment, it is detected that one object to be detected is decelerated to a threshold velocity or less, or it is continuously detected that two objects to be detected are decelerated to a threshold velocity or less. Then, when the approach of the object is detected, the water discharge is started.

That is, it can be found whether the object approaches or moves away, based on an increase or decrease in an amplitude of a detecting signal. Accordingly, more precise detecting is realized by adding the approach as a determination factor of the start of the water discharge.

Figure 17:
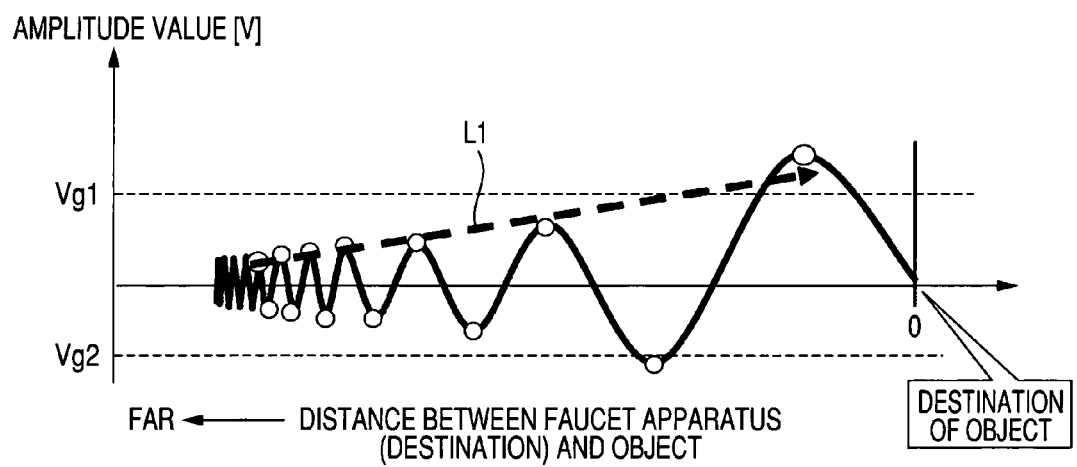
FIG. 17 is a diagram illustrating an example of an amplitude change of the detecting signal with respect to a distance to a destination when the object is approaching to the destination, according to a third exemplary embodiment of the present invention.

FIG. 17 is a diagram illustrating an example of an amplitude change of the detecting signal with respect to a distance to a destination (e.g., a water discharge system) when the object is approaching the destination. As shown in FIG. 17, when the object approaches, the amplitude of the detecting signal increases over time. For this reason, an approximation line or an envelope of the maximum value has an inclination of a positive value, and an approximation line or an envelope of the minimum value has an inclination of a negative value. On the contrary, when the object moves away, the amplitude of the detecting signal decreases over time. Accordingly, an approximation line or an envelope of the maximum value has an inclination of a negative value, and an approximation line of the minimum value has an inclination of a positive value.

Figure 18:
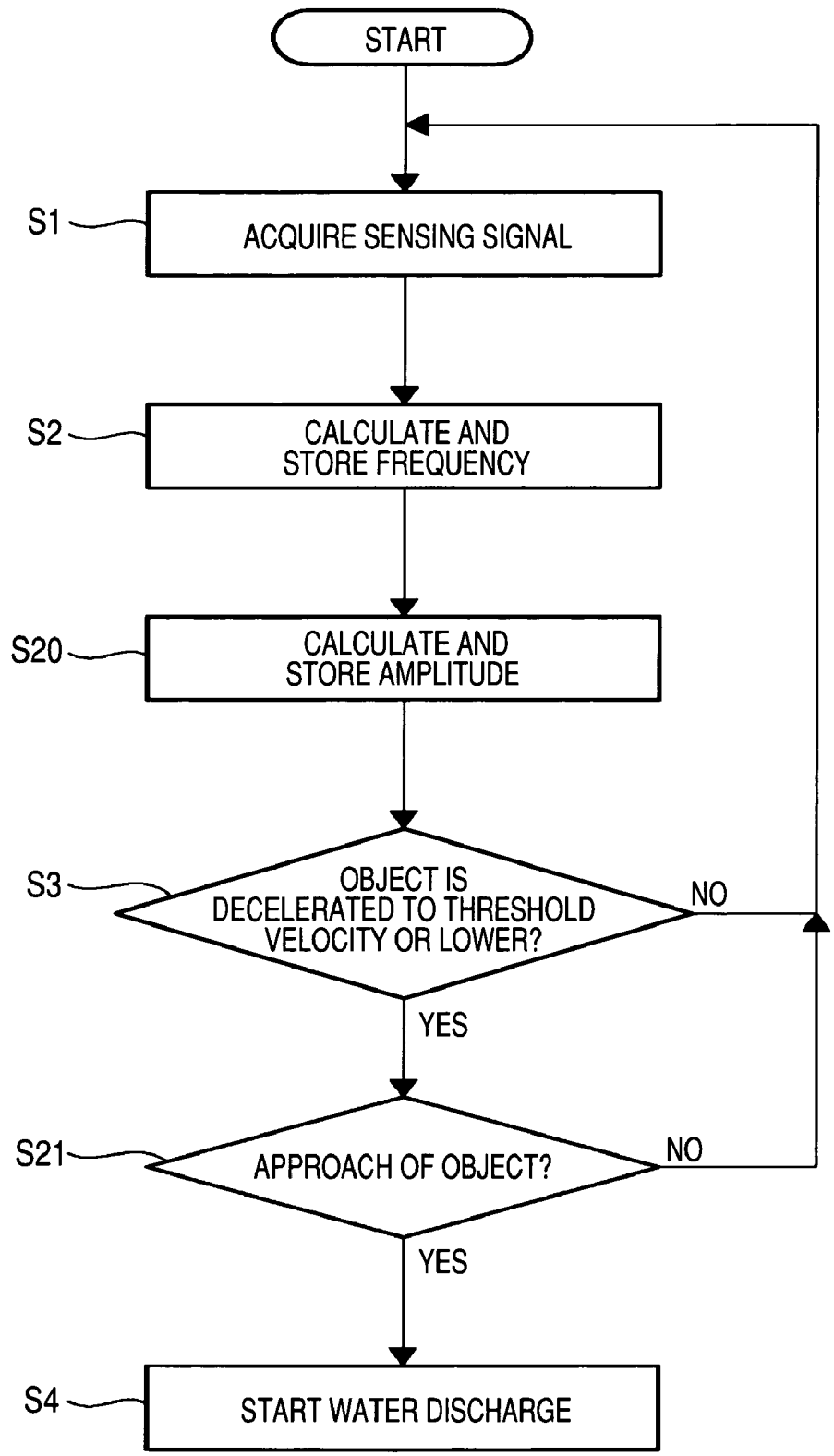
FIG. 18 is a flowchart illustrating a start process for water discharge of the control unit 200 according to the third exemplary embodiment of the present invention.

FIG. 18 is a flowchart illustrating a start process for water discharge of the control unit 200 according to the third exemplary embodiment of the present invention.

Although the flowchart of FIG. 18 in the third exemplary embodiment is based on the flowchart of FIG. 8 of the first exemplary embodiment, the third exemplary embodiment may also be applied to the deceleration detecting of the first object or the deceleration detecting of the second object of the second exemplary embodiment (see FIG. 11).

In the example shown in FIG. 18, the control unit 200 acquires a detecting signal (Operation S1), calculates a frequency of the object from the acquired detecting signal and stores the frequency (Operation S2), and calculates amplitude of the acquired detecting signal and stores the amplitude (Operation S20).

It is then determined whether the object is decelerated to a threshold velocity of less (v1 or less) at Operation S3. If it is determined that the object is not decelerated to the threshold velocity (Operation S3: NO), the process returns to Operation S1. When it is determined that the object is decelerated to a threshold velocity or less (v1 or less) (Operation S3: YES), it is determined whether the object approaches, based on the amplitude of the detecting signal (Operation S21).

When it is determined that the object does not approach (Operation S21; NO), the process returns to Operation S1 and the detecting signal is acquired again. When it is determined that the object approaches (Operation S21: YES), the valve 250 is opened to start water discharge (Operation S4).

In this case, the determination of the approach of the object to be detected is, for example, as follows.

First, in the Operation S20, the maximum value of amplitude with respect to the object is calculated from a detecting signal acquired at this time and then the maximum value is stored. Also, the maximum value of amplitude calculated from one or more detecting signals is previously stored in the control unit 200. In Operation S21, an inclination of an approximation line (see e.g., line L1 in FIG. 17) or an envelope is calculated from these maximum values. When the inclination is over a threshold value (0 or positive value), the object is determined to be approaching. When the inclination is the threshold value or less, the object is determined to be not approaching.

In Operation S21, when the maximum value continuously increases for a certain number of times, the object is determined to be approaching. Otherwise, the object is determined to be not approaching.

In Operation S21, when the maximum value is a threshold value (see e.g., $V_{g1}$ in FIG. 17) or more, the object is determined to be approaching. Otherwise, the object is determined to be not approaching.

In Operation S20, the maximum value and the minimum value of amplitude with respect to the object are calculated from the detecting signal and the values are stored. In Operation S21, when the maximum value is a first threshold value (e.g., Vg1 in FIG. 17) or more and the minimum value is a second threshold value (e.g., Vg2 in FIG. 17) or less, the object is determined to be approaching. Otherwise, the object is determined to be not approaching.

In Operation S20, a difference between the maximum value and the minimum value of the object is calculated and the difference is stored. In Operation S21, when the difference continuously increases for a certain number of times, the object is determined as approach. Otherwise, the object is determined to be not approaching.

According to the third exemplary embodiment, since the detecting of the approach of the object in which the amplitude of the detecting signal is considered is added as a determination factor for starting water discharge, more precise detecting can be performed. With such a configuration, for example, when a person passes in front of the water discharge system, it is possible to prevent wasteful water discharge due to erroneous detection. That is, in the case that a person passes in front of the water discharge system, the frequency of the detecting signal is slightly changed, but the frequency does not increase as much over the threshold value as the amplitude does. Accordingly, it is possible to determine whether a person approaches the water discharge system or a person only passes by before the water discharge system by considering the amplitude change Next, a fourth exemplary embodiment of the present invention will be described. In the fourth exemplary embodiment, when two decelerations of a first object (e.g. a body) and a second object are detected and then acceleration of the first object is detected, the number of times of deceleration detecting is reset and the deceleration detecting according to movement of another user is considered as the first deceleration detecting according to approach of another first object (e.g., a second body). Accordingly, it is possible to determine that the deceleration at the time when the first user moves away and the next user uses the water discharge system is the first deceleration detecting. Therefore, it is possible to perform the detecting with high precision.

Figure 19:
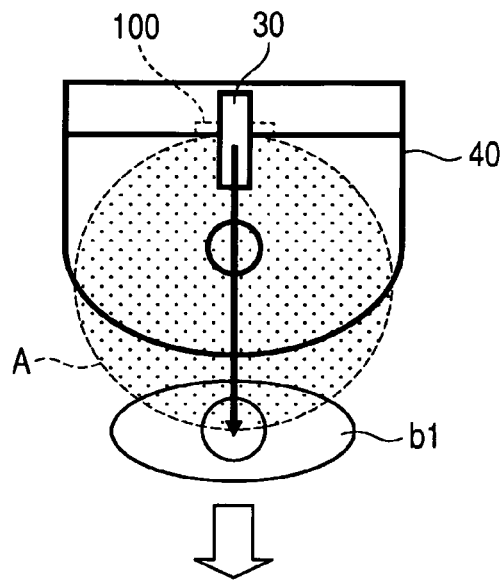
FIG. 19 is a top view illustrating a state in which a first object to be detected moves away from a destination, according to a fourth exemplary embodiment of the present invention.

FIG. 19 is a top view illustrating that a first object (e.g., a first body) moves away from a destination (e.g., a front of a water discharge system).

Figure 20:
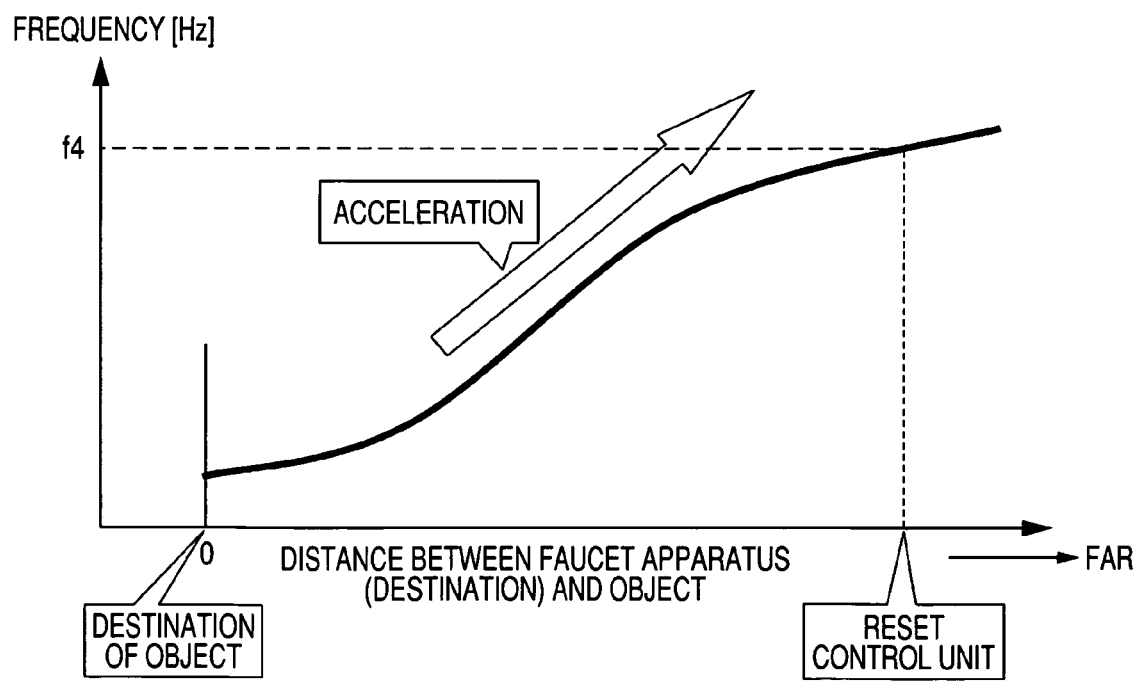
FIG. 20 is a diagram illustrating an example of frequency change of the detecting signal with respect to a distance to a destination when the first object moves away from the destination, according to the fourth exemplary embodiment of the present invention.

FIG. 20 is a graph illustrating an example of a change in frequency of a detecting signal with respect to a distance from a destination in the case that a first object moves away from the destination, where the first object may be an object to be washed, such as a toothbrush, or a cup, instead of user's hands.

As shown FIG. 19, when the first object (e.g., body) b1 moves away from a detectable range A of the sensor unit 100 in front of the water discharge system, the first object b1 accelerates. Accordingly, as shown in FIG. 20, the frequency of the detecting signal increases. With such a configuration, it is detected that the object moves away from the water discharging portion, that is, it is detected that the object moves away from a water receiving unit 40, a position under the spout 30, a position on a trace of water discharging flow, or a water falling position from the spout 30 to the water receiving unit 40, and thus it is possible to stop water discharge.

Figure 21:
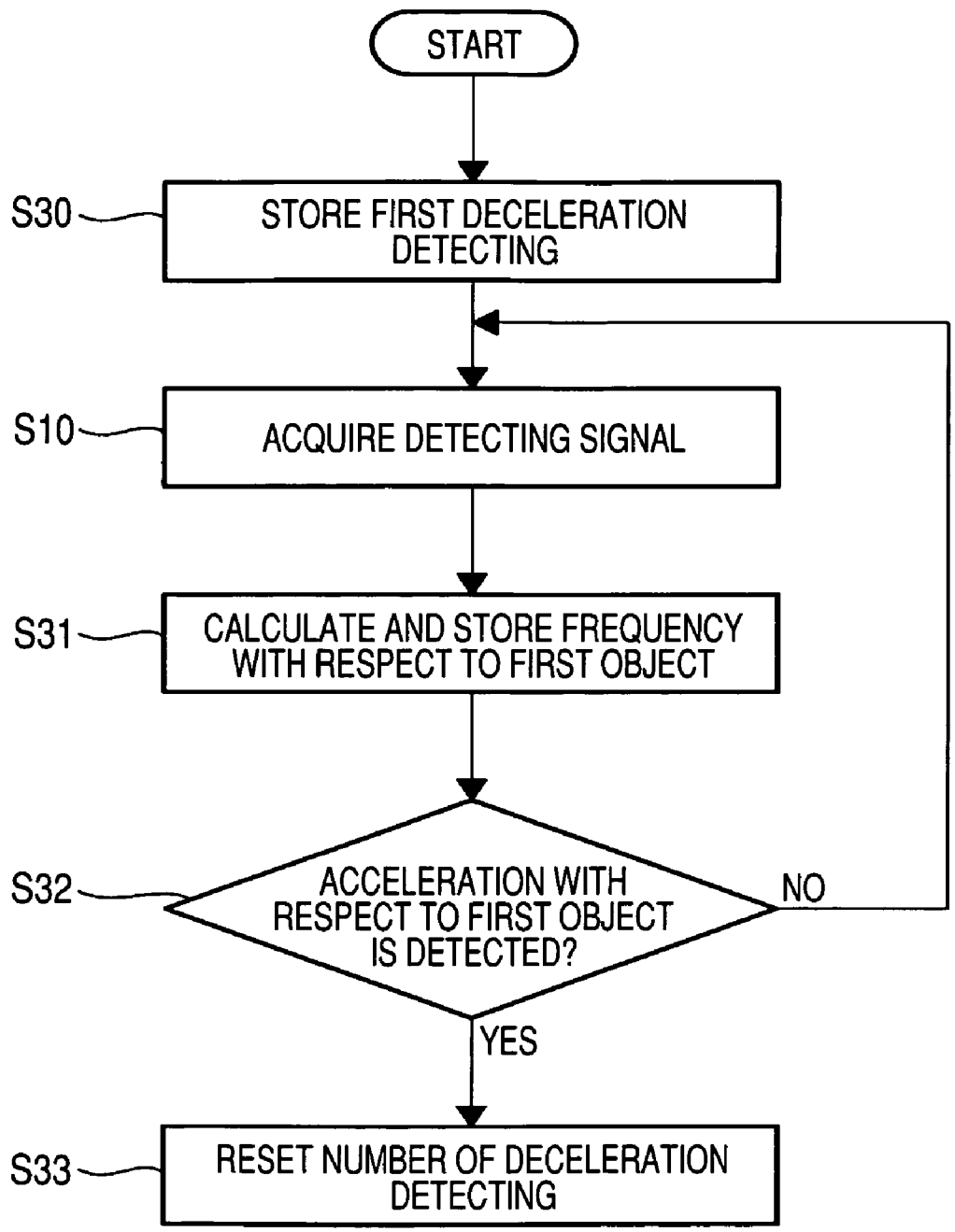
FIG. 21 is a flowchart illustrating a process for resetting a number of times the control unit 200 performs deceleration detecting according to the fourth exemplary embodiment of the present invention.

FIG. 21 is a flowchart illustrating a process for resetting a number of times of deceleration detecting of the control unit 200 according to the fourth exemplary embodiment of the present invention.

In the second exemplary embodiment, when the control unit 200 detects that the first object (e.g., body) is decelerated, for examples the first deceleration detecting is stored. Then, the processes (Operations S10 to S12 in FIG. 11) for detecting the second deceleration according to the movement of the second object (e.g., a hand or object to be washed) are performed, thereby controlling the start and end of the water discharge.

However, for example, it is thought that a number of times of deceleration cannot be found at the time of use of a next user after the first user moves away.

In the flowchart shown in FIG. 21, the water discharge is not started by considering the deceleration of a second object (e.g., a next user) as the second deceleration when the first object (e.g., a user) is changed, in the course of the process of the second deceleration detecting.

In FIG. 21, when the deceleration of the first object is detected (e.g., using Operations S1 to S3 in FIG. 11) from the deceleration detecting of the first object, the control unit 200 stores the first deceleration detecting in a memory or the like (Operation S30).

Then, the control unit 200 acquires a detecting signal from the sensor unit 100 (Operation S10), and the control unit 200 calculates a frequency with respect to the first object from the detecting signal and then stores the frequency (Operation S31).

In this case, the control unit 200 can recognize that the first object (e.g., the body) is located in front of the water discharge system, based on the amplitude of the acquired detecting signal. Then, the frequency with respect to the first object can be calculated from the amplitude of the acquired detecting signal.

The control unit 200 determines whether the acceleration of the first object is detected based on the calculated frequency of the first object (Operation S32).

In this case, the acceleration determination of the first object is, for example, as follows.

When the frequency of the first object continuously increases for a certain number of times, it is determined that the acceleration is detected. Otherwise, it is determined that the acceleration is not detected.

Alternatively, when the frequency of the first object increases and is higher than a threshold frequency (see e.g., f4 in FIG. 20), it is determined that the acceleration is detected. Otherwise, it is determined that the acceleration is not detected.

As a result, when it is determined that the acceleration of the first object is not detected (Operation S32: NO), the process returns to Operation S10. When it is determined that the acceleration of the first object is detected (Operation S32: YES), the control unit 200 resets the number of times of the deceleration detecting stored in the memory (Operation S33). That is, after the number of times of the first deceleration is reset, the process returns to the process (Operations S1 to S3 in FIG. 11) of the deceleration detecting of the first object.

According to the fourth exemplary embodiment, when it is detected that the user moves away from the water discharge system by detecting the acceleration of the first object, the number of times of the deceleration detecting is reset. Accordingly, even when the user is changed, it is possible to start water discharge at the optimum time according to the movement of the user's hand.

Next, a fifth exemplary embodiment of the present invention will be described. In the fifth exemplary embodiment, when it is detected that a first object is accelerated and it is detected that the first object moves away, the number of times of deceleration detecting is reset. The deceleration detecting according to movement of next user is considered as the first deceleration detecting according to approach of another first object (e.g., a body).

It can be found that the object moves away from the destination, from a decrease in amplitude value of voltage of a detecting signal. Accordingly, the detecting of the moving away is added as a determination factor in resetting the number of times of the deceleration detecting, and thus more precise detecting can be performed.

Figure 22:
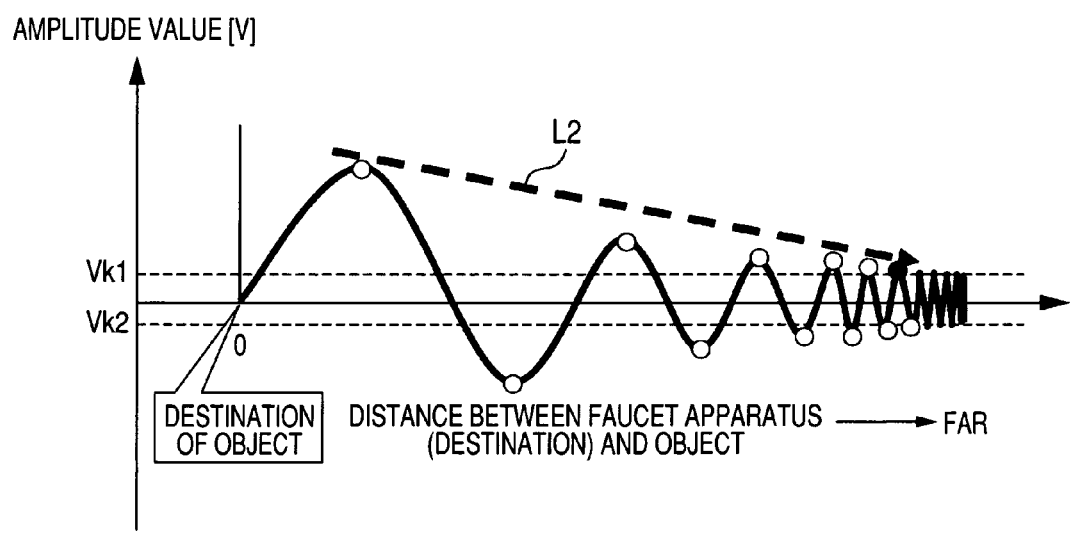
FIG. 22 is a diagram illustrating an example of amplitude change of the detecting signal with respect to a distance from a destination when the object to be detected moves away from the destination, according to a fifth exemplary embodiment of the present invention.

FIG. 22 is a diagram illustrating an example of amplitude change of the detecting signal with respect to a distance from the water discharge system when the object moves away from a destination.

As shown in FIG. 22, when the object moves away, the amplitude of the detecting signal decreases over time. For this reason, an approximation line or an envelope of the maximum value has an inclination of a negative value, and an approximation line or an envelope of the minimum value has an inclination of a positive value.

Figure 23:
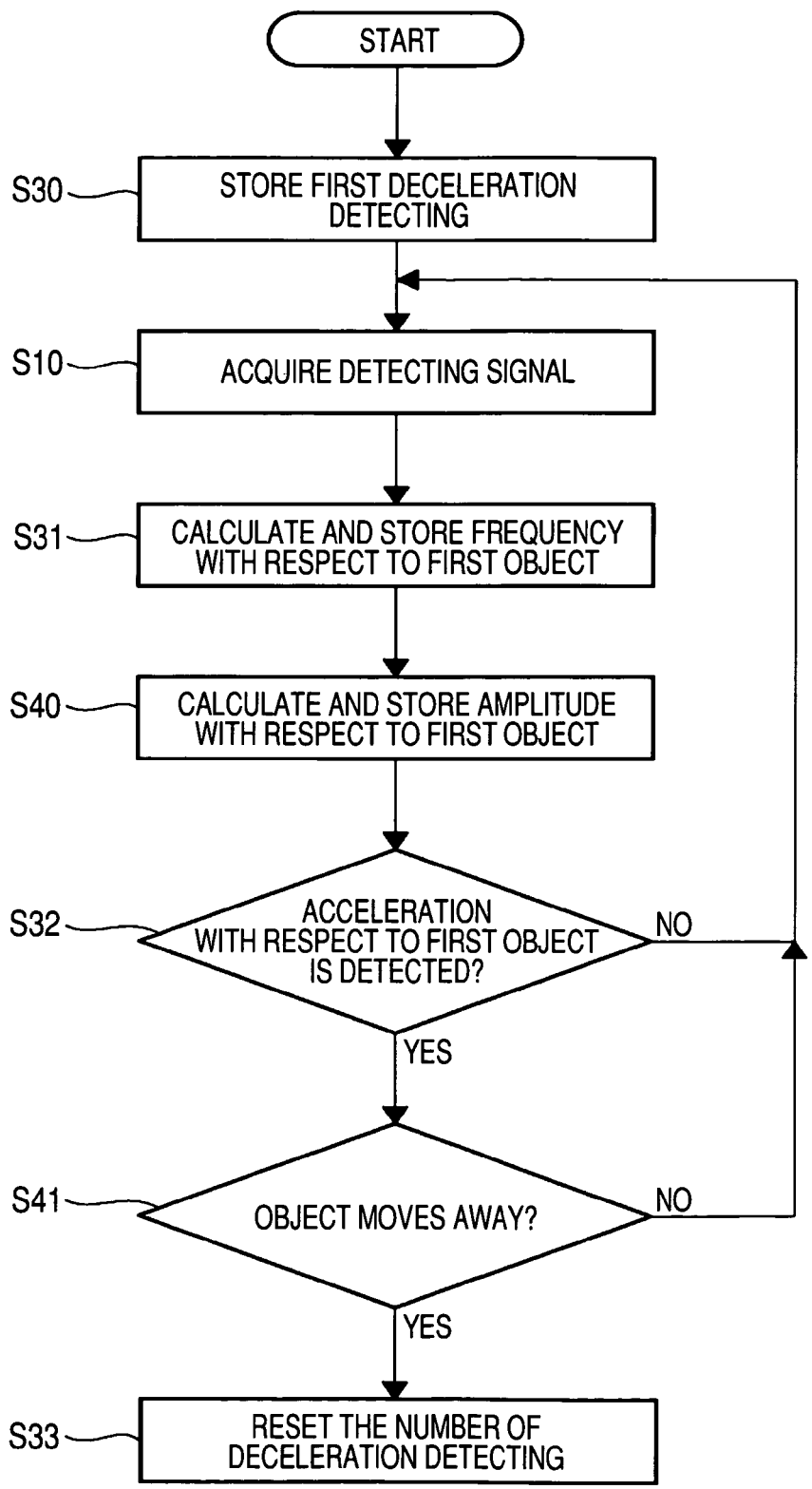
FIG. 23 is a flowchart illustrating a process for resetting a number of times the control unit 200 performs deceleration detecting according to the fifth exemplary embodiment of the present invention.

FIG. 23 is a flowchart illustrating a sequence for resetting a number of times of deceleration detecting of the control unit 200 according to the fifth exemplary embodiment of the present invention.

In the example shown in FIG. 23, the control unit 200 detects the deceleration of the first object according to the process (e.g., Operation S1 to S3 in FIG. 11) of the deceleration detecting of the first object, and the first deceleration detecting is stored in a memory or the like (Operation S30). The control unit 200 acquires a detecting signal from the sensor unit 100 (Operation 10). A frequency with respect to the first object is calculated from the detecting signal and the frequency is stored (Operation S31). An amplitude with respect to the first object is calculated and the amplitude is stored (Operation S40).

The control unit 200 then determines whether acceleration of the first object is detected (Operation S32). When it is determined that the acceleration of the first object is not detected (Operation S32: NO), the process returns to Operation S10. When it is determined that the acceleration of the first object is detected (Operation S32: YES), and then the control unit 200 determines whether the first object moves away from the destination based on the amplitude of the first object (Operation S41).

As a result, when it is determined that the first object does not move away (Operation S41: NO), the process returns to Operation S10 and then the detecting signal is acquired again. When it is determined that the first object moves away from the water discharge system (Operation S41: YES), a number (the first deceleration detecting) of times of the deceleration detecting stored in the memory is reset (Operation S33).

In this case, it is determined that the first object moves away from the water discharge system as follows.

First, in Operation S40, the maximum value of amplitude with respect to the first object is calculated from the detecting signal acquired at this time, and the maximum value is stored. The maximum value of amplitude with respect to the first object calculated from one or more detecting signals acquired at a former time is stored in the control unit 200. In Operation S41, an inclination of an approximation line (see e.g., line L2 in FIG. 22) or an envelope with respect to these maximum values is calculated. When the inclination is smaller than a threshold value (e.g., 0 or a negative value), it is determined that the first object has moved away. When the inclination is the threshold value or more, it is determined that the first object has not moved away.

In Operation S41, when the maximum value continuously decreases for a threshold number of times, it is determined that the first object moves away. Otherwise, it is determined that the first object does not move away.

In Operation S41, when the maximum value is a threshold value (e.g., Vk1 in FIG. 22) or less, it is determined that the first object moves away. Otherwise, it is determined that the first object does not move away.

In Operation S40, the maximum value and the minimum value with respect to the first detecting signal are calculated from the detecting signal and then they are stored. In Operation 41, when the maximum value is a first threshold value (see e.g., $V_{k1}$ in FIG. 22) or less and the minimum value is a second threshold value (see e.g., $V_{k2}$ in FIG. 22) or more, it is determined that the first object moves away. Otherwise, it is determined that the first object does not move away.

In Operation S40, a difference between the maximum value and the minimum value with respect to the first object is calculated and the difference is stored. In Operation S41, when the difference continuously decreases for a certain number of times, it is determined that the first object moves away. Otherwise, it is determined that the first object does not move away.

According to the fifth exemplary embodiment, detecting that the first object moves away is added as a determination factor in resetting the number of times of deceleration detecting. It is therefore possible to more precisely detect that the user has moved away from the water discharge system.

Next, a sixth exemplary embodiment of the present invention will be described. In the sixth exemplary embodiment, when deceleration of two objects of a first object (e.g., a body) and a second object (e.g., a user's hand or object to be washed) is detected, and when the object is not identified from a detecting signal for a certain time, it is considered that the user has moved away and that there is no user. Then, a number of times of deceleration detecting is reset, and the deceleration detecting according to movement of a next user is considered as the first deceleration detecting according to approach of the next first object (e.g., a next body).

Accordingly, it is possible to find a number of times of deceleration at the time of use of the next user after the first user moves away, and thus it is possible to perform high precise detecting.

Figure 24:
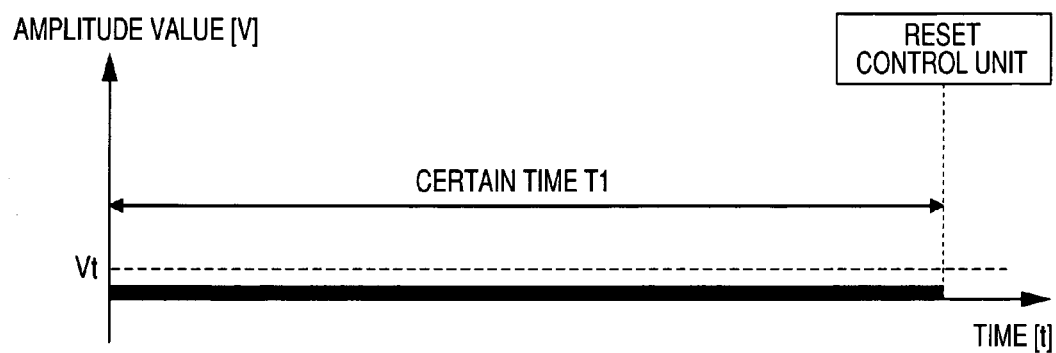
FIG. 24 is a time chart illustrating an example of the detecting signal when no object exists according to a sixth exemplary embodiment of the present invention.

FIG. 24 is a time chart illustrating an example of a detecting signal in the case that there is no user.

Figure 25:
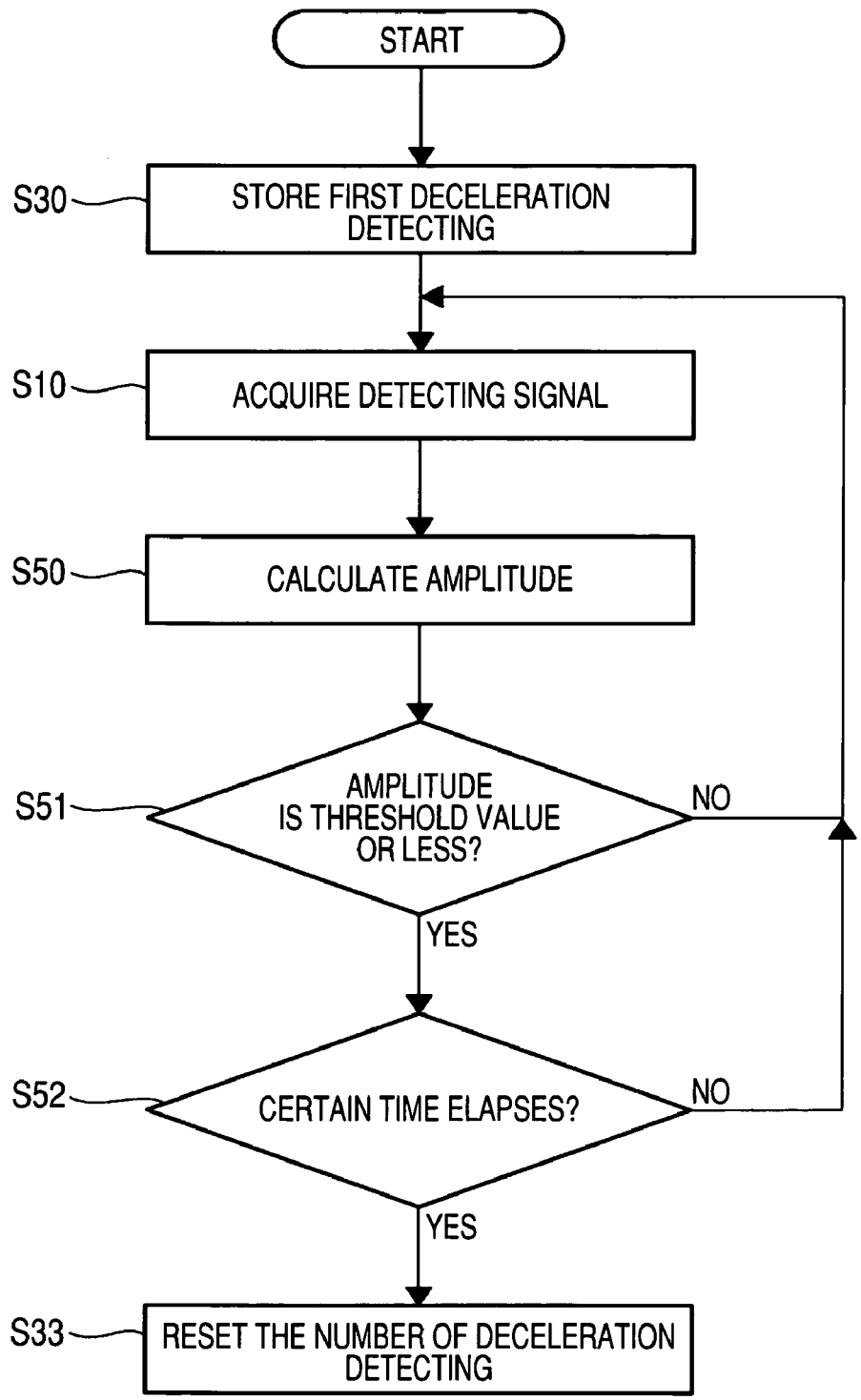
FIG. 25 is a flowchart illustrating a process for resetting a number of times the control unit 200 performs deceleration detecting according to the sixth exemplary embodiment of the present invention.

FIG. 25 is a flowchart illustrating a reset process for resetting a number of times of deceleration detecting of the control unit 200 in the sixth exemplary embodiment of the invention.

In the example shown in FIG. 25, the control unit 200 detects deceleration of the first object according to a process (e.g., Operations S1 to S3 in FIG. 11) of deceleration detecting of the first object. The control unit 200 stores the first deceleration detecting in a memory or the like (Operation S30). The control unit 200 acquires a detecting signal from the sensor unit 100 (Operation S10). The control unit 200 calculates amplitude of the detecting signal and stores the amplitude (Operation S50).

In this case, the amplitude of the detecting signal is, for example, the maximum amplitude in the frequency band (e.g., 0 to 100 Hz) of the detecting signal.

The control unit 200 determines whether the amplitude of the detecting signal acquired at this time is a threshold value (see e.g., $V_t$ in FIG. 24) or less (Operation S51).

When it is determined that the amplitude of the detecting signal acquired at this time is the threshold value or less (Operation S51: YES), it is considered that the object cannot be identified from the detecting signal. Then, it is determined whether a threshold time has elapsed (see e.g., T1 in FIG. 24) in Operation S52.

For example, the control unit 200 counts the time using a timer or the like. When it is determined that the amplitude of the detecting signal is over the threshold value (Operation S51: NO), the timer is reset and then the process returns to the acquisition of the detecting signal in Operation S10.

When the time when the amplitude of the detecting signal is the threshold value or less is smaller than the threshold time (Operation S52: NO), the control unit 200 does not reset the timer and the process returns to the acquisition of the detecting signal in Operation S10. When the time when the amplitude of the detecting signal is the threshold value or less is the threshold time or more (Operation S52: YES), the number (the first deceleration detecting) of times of deceleration detecting stored in the memory is reset (Operation S33).

According to the sixth exemplary embodiment, when the detecting signal cannot be identified for a certain time, the number of times of deceleration detecting is reset. Accordingly, even when the user is changed, it is possible to start water discharge at the optimum time.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claims all such changes and modifications as fall within the true spirit and scope of the present invention.

What is claimed is:

1. A water discharge system comprising:
a spout that discharges water;
a sensor unit configured to radiate an electric wave and receive a reflected wave of the electric wave reflected by an object so as to acquire information about movement of the object,
a control unit which controls a valve based on the information acquired by the sensor unit, wherein when the valve is open, the water is discharged from the spout;
wherein the sensor unit is configured to radiate the electric wave such that a detectable area of the sensor unit is formed around trace of discharge flow of the water discharge from the spout,
wherein the control unit comprises:
a determination unit configured to determine whether a velocity of the object is a velocity just before stopping, if the object is approaching the trace of discharge flow of the water while decelerating and then stops on the trace of discharge flow,
wherein when the determination unit determines that the velocity of the object is the velocity just before stopping, the control unit opens the valve so that the spout can discharge water just before or at the same time the object reaches the trace of discharge flow of the water.

2. The water discharge system of claim 1, wherein the determination unit is configured to further determine whether the object is approaching the vicinity of the trace of discharge flow of the water, and
wherein when the determination unit determines that the velocity of the object is the velocity just before stopping and the object is approaching the vicinity of the trace of discharge flow of the water, the control unit opens the valve so that the spout can discharge water just before or at the same time the object reaches the trace of discharge flow of the water.

3. The water discharge system of claim 1, wherein the determination unit is configured to further determine whether the object is decelerating, and
wherein when the determination unit determines that the velocity of the object is the velocity just before stopping and the object is decelerating, the control unit opens the valve so that the spout can discharge water just before or at the same time the object reaches the trace of discharge flow of the water.

* * * * *